(12) United States Patent
Kimura et al.

(10) Patent No.: US 9,798,183 B2
(45) Date of Patent: Oct. 24, 2017

(54) LIQUID CRYSTAL DISPLAY DEVICE, COLOR FILTER SUBSTRATE, AND METHOD FOR PRODUCING COLOR FILTER SUBSTRATE

(71) Applicant: Toppan Printing Co., Ltd., Taito-ku (JP)

(72) Inventors: Yukihiro Kimura, Taito-ku (JP); Kenzo Fukuyoshi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 106 days.

(21) Appl. No.: 14/753,577

(22) Filed: Jun. 29, 2015

(65) Prior Publication Data

US 2015/0301402 A1 Oct. 22, 2015

Related U.S. Application Data

(63) Continuation of application No. PCT/JP2013/070417, filed on Jul. 29, 2013.

(30) Foreign Application Priority Data

Dec. 27, 2012 (JP) ................................ 2012-286224

(51) Int. Cl.
*G02F 1/1335* (2006.01)
*G02B 5/20* (2006.01)
(Continued)

(52) U.S. Cl.
CPC ....... *G02F 1/133514* (2013.01); *G02B 5/201* (2013.01); *G02F 1/1336* (2013.01);
(Continued)

(58) Field of Classification Search
CPC ......... G02F 1/133514; G02F 1/133512; G02F 1/13338; G02F 1/1336; G02B 5/201; G06F 3/0412; G06F 3/042
See application file for complete search history.

(56) References Cited

U.S. PATENT DOCUMENTS

2003/0122998 A1\* 7/2003 Iijima ............... G02F 1/133514
349/106
2006/0244693 A1 11/2006 Yamaguchi et al.
(Continued)

FOREIGN PATENT DOCUMENTS

JP 9-160014 6/1997
JP 10-171599 6/1998
(Continued)

OTHER PUBLICATIONS

Extended European Search Report issued Dec. 20, 2016 in Patent Application No. 13869837.8.
(Continued)

*Primary Examiner* — James Dudek
(74) *Attorney, Agent, or Firm* — Oblon, McClelland, Maier & Neustadt, L.L.P.

(57) ABSTRACT

A liquid crystal display device includes an array substrate, a liquid crystal layer, and a color filter substrate facing the array substrate through the liquid crystal layer. The color filter substrate includes a carbon light-shielding layer, an organic pigment light-shielding layer, and color filters formed such that the organic pigment light-shielding layer overlaps with at least one of the color filters in a direction perpendicular to a substrate plane. The array substrate includes a first light sensor that detects light which passes through any of the color filters without passing through the organic pigment light-shielding layer in the direction perpendicular to the substrate plane. The array substrate further includes a second light sensor that detects light which passes (Continued)

through the organic pigment light-shielding layer and any of the color filters in the direction perpendicular to the substrate plane.

11 Claims, 16 Drawing Sheets

(51) Int. Cl.
  *G02F 1/1333* (2006.01)
  *G06F 3/041* (2006.01)
  *G06F 3/042* (2006.01)

(52) U.S. Cl.
  CPC .... *G02F 1/13338* (2013.01); *G02F 1/133512* (2013.01); *G06F 3/042* (2013.01); *G06F 3/0412* (2013.01); *G02F 2201/58* (2013.01)

(56) References Cited

U.S. PATENT DOCUMENTS

| 2009/0161051 A1 | 6/2009 | Fukunaga et al. |
| 2010/0201664 A1 | 8/2010 | Lee et al. |
| 2011/0043486 A1 | 2/2011 | Hagiwara et al. |
| 2011/0109592 A1 | 5/2011 | Kurokawa et al. |

FOREIGN PATENT DOCUMENTS

| JP | 2002-335454 | 11/2002 |
| JP | 2007-18458 | 1/2007 |
| JP | 2009-151039 | 7/2009 |
| JP | 2009-229838 A | 10/2009 |
| JP | 2010-186997 | 8/2010 |
| JP | 2011-065133 | 3/2011 |
| JP | 2011-118888 | 6/2011 |

OTHER PUBLICATIONS

U.S. Appl. No. 14/815,194, filed Jul. 31, 2015, Kimura, et al.
U.S. Appl. No. 14/754,099, filed Jun. 29, 2015, Kimura, et al.
International Search Report issued Sep. 24, 2013, in PCT/JP2013/070417 filed Jul. 29, 2013.
Partial Supplementary European Search Report issued Aug. 10, 2016 in Patent Application No. 13869837.8.

* cited by examiner

LIQUID CRYSTAL DISPLAY DEVICE, COLOR FILTER SUBSTRATE, AND METHOD FOR PRODUCING COLOR FILTER SUBSTRATE

CROSS-REFERENCE TO RELATED APPLICATIONS

The present application is a continuation of International Application No. PCT/JP2013/070417, filed Jul. 29, 2013, which is based upon and claims the benefits of priority to Japanese Application No. 2012-286224, filed Dec. 27, 2012. The entire contents of these applications are incorporated herein by reference.

BACKGROUND OF THE INVENTION

Field of the Invention

The present invention relates to a liquid crystal display device, a color filter substrate and a method for producing the color filter substrate.

Discussion of the Background

Efforts for reducing the weight of electronic equipment, including liquid crystal display devices, have been made. For example, liquid crystal display devices are included in information devices such as cellular phones or portable computers. As an example for operating the information devices, for example, a technique for inputting directly to liquid crystal display surfaces with fingers, pointers or the like is employed.

Direct input methods to liquid crystal display surfaces include an on-cell method. In the on-cell method, a touch panel having a sensing function is provided on a front surface of a liquid crystal panel, and the touch panel receives input. Also, direct input methods to liquid crystal display surfaces include an in-cell method. In the in-cell method, a matrix of sensors having a sensing function is disposed in an array substrate or a counter substrate of a liquid crystal display device, and the sensors are provided inside a liquid crystal cell.

As an example of techniques employed in on-cell methods, PTL1 (Japanese Patent Application Publication No. H10-171599) has disclosed touch panels of a resistive film type, electromagnetic induction type, electrostatic capacitive type and optical type.

However, in on-cell methods where touch panels are provided on the liquid crystal display surfaces, the thickness and weight of the touch panels are added to the liquid crystal display devices, which causes increase in thickness and weight. Further, light reflection from top surfaces of touch panels and inner surfaces of touch panels sometimes lowers quality of liquid crystal display.

In contrast, in in-cell methods where sensors are provided inside liquid crystal cells, thicknesses of liquid crystal display devices do not increase, and display quality is unlikely to lower. Accordingly, in-cell methods are preferably used. As an example of sensors having a sensing function, light sensors have been developed.

In liquid crystal display devices used in electronic equipment or information devices, stereoscopic image display tends to be used. Regarding stereoscopic image display by liquid crystal display devices, technical requirements have increased. For example, there is a need for a click feeling to buttons displayed stereoscopically. For example, input with fingers needs prevention of incorrect operation.

If liquid crystal panels include light sensors, in order to prevent false detection from occurring because of effects of temperature or backlight sources, there is sometimes a need for compensating results detected by the light sensors.

As an example of sensors, silicon photodiodes are used, the silicon photodiodes having channel layers containing polysilicon or amorphous silicon. The silicon photodiodes generate dark current due to changes in such as ambient temperature. This may cause noise, which is not observed light, to be added to observed data.

PTL2 (Japanese Patent Application Publication No. 2002-335454) and PTL3 (Japanese Patent Application Publication No. 2007-18458) have disclosed that operational compensation is performed using a photodiode that corrects the dark current. In PTL2 and PTL3, imaging elements compensate the dark current.

PTL4 (Japanese Patent Application Publication No. 2009-151039) has disclosed a technique where the S/N ratio of detected signals is improved by operation using signals of a first light receiving element and signals of a second light receiving element. However, this PTL4 has not disclosed a technique for color-separating visible light accurately. The display device of PTL4 (Claim 1) includes an optical filter disposed on the first light receiving element and absorbing light in a visible light region. Further, the display device of PTL4 includes a light-shielding portion that absorbs/shields incident light.

However, color-separation of blue light, green light and red light is not suggested or mentioned in the PTL4. Further, PTL4 has not disclosed an alignment method for producing color filter substrates. PTL4 (paragraph [0013]) has disclosed touch sensing where a noise component is cancelled.

PTL5 (Japanese Patent Application Publication No. 2010-186997) and PTL6 (Japanese Patent Application Publication No. 2011-118888) have disclosed light sensors (light receiving elements) made of oxide semiconductors. PTL5 has disclosed a light sensor employed in displays using mainly organic substances as emission layers. PTL6 has disclosed a display device having, in addition to a light sensor as an area sensor, another light sensor for position detection. PTL7 (Japanese Patent Application Publication No. 2011-065133) has disclosed a liquid crystal display device having a light sensor for short wavelengths, a light sensor for red and a light sensor for infrared light.

PTL1: Japanese Patent Application Laid Open Publication No. H10-171599
PTL2: Japanese Patent Application Laid Open Publication No. 2002-335454
PTL3: Japanese Patent Application Laid Open Publication No. 2007-18458
PTL4: Japanese Patent Application Laid Open Publication No. 2009-151039
PTL5: Japanese Patent Application Laid Open Publication No. 2010-186997
PTL6: Japanese Patent Application Laid Open Publication No. 2011-118888
PTL7: Japanese Patent Application Laid Open Publication No. 2011-065133

SUMMARY OF THE INVENTION

According to one aspect of the present invention, a liquid crystal display device includes an array substrate, a liquid crystal layer, and a color filter substrate facing the array substrate through the liquid crystal layer. The color filter substrate includes a carbon light-shielding layer, an organic pigment light-shielding layer, and color filters formed such that the organic pigment light-shielding layer overlaps with at least one of the color filters in a direction perpendicular to a substrate plane. The array substrate includes a first light sensor that detects light which passes through any of the color filters without passing through the organic pigment light-shielding layer in the direction perpendicular to the substrate plane. The array substrate further includes a second light sensor that detects light which passes through the organic pigment light-shielding layer and any of the color filters in the direction perpendicular to the substrate plane.

According to another aspect of the present invention, a color filter substrate includes a transparent substrate, a carbon light-shielding layer including carbon as a main material of light-shielding materials, color filters including a red filter, a blue filter and a green filter in openings sectioned on the transparent substrate, and an organic pigment light-shielding layer formed on the color filters and including an organic pigment as a main material of light-shielding color materials. The color filters, the carbon light-shielding layer, and the organic pigment light-shielding layer are formed such that the color filters have a portion which does not overlap with the carbon light-shielding layer and the organic pigment light-shielding layer in a direction perpendicular to a plane of the transparent substrate, and that the color filters have a portion which overlaps with the organic pigment light-shielding layer and does not overlap the carbon light-shielding layer in the direction perpendicular to the plane of the transparent substrate.

According to still another aspect of the present invention, a method of producing a color filter substrate includes forming a carbon light shielding layer and an alignment mark on a transparent substrate, forming color filters including a red filter, a blue filter and a green filter, coating a light-shielding resist including an organic pigment on the color filters, detecting the alignment mark by infrared light and an infrared light sensor, aligning the transparent substrate and a photomask based on the alignment mark, and forming an organic pigment light-shielding layer by exposing the coating of the light-shielding resist to light through the photomask, and developing and curing the coating.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
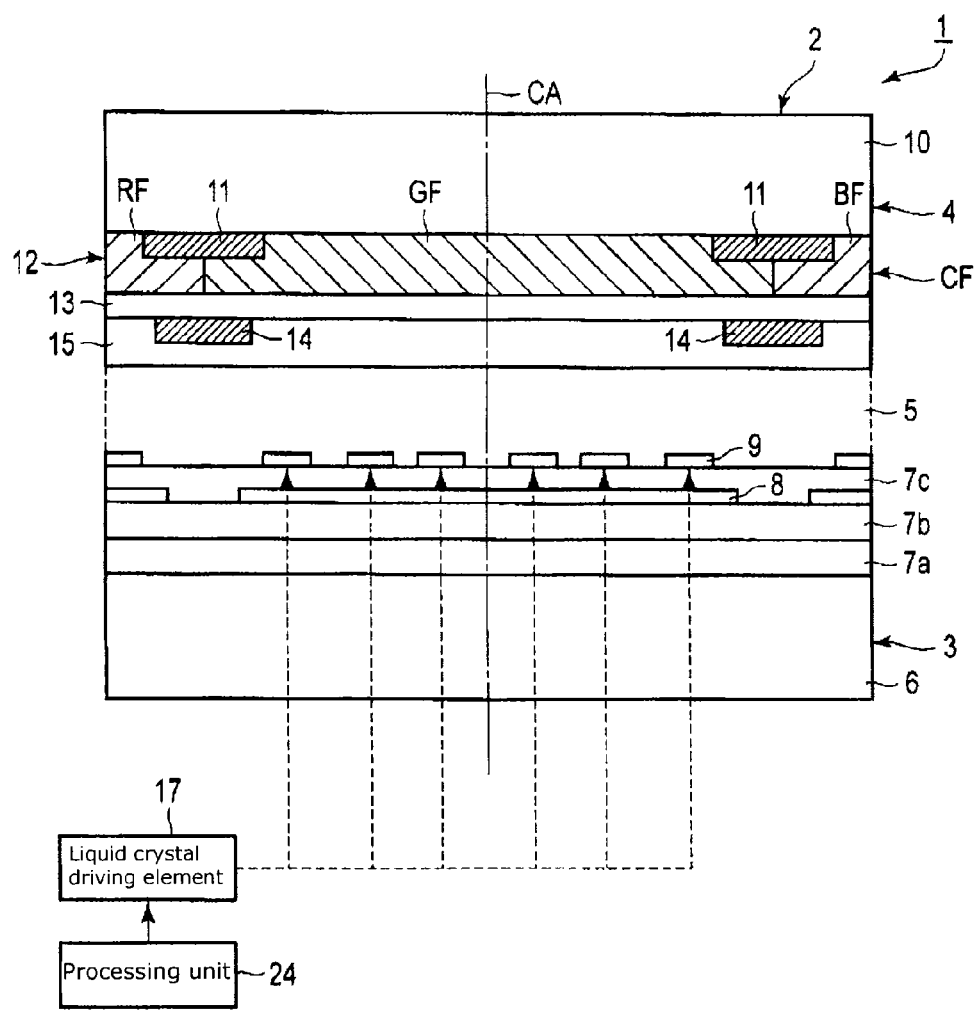
FIG. 1 is a partial cross-sectional view showing an example of configurations of a liquid crystal panel included in a liquid crystal display device according to a first embodiment of the present invention.

With reference to the drawings, hereinafter is described an embodiment of the present invention. It should be noted that, in the following descriptions, the same or substantially same functions and constituents are labelled with the same reference symbols, and are described as necessary.

In each embodiment, only characteristic parts are described. Regarding parts having no differences from the constituents of usual liquid crystal display devices, the descriptions are omitted.

In each embodiment, a case where unit of display of a single color is one picture element is described. However, the unit of display of a single color may be one sub pixel, alternatively a plurality of pixels (number of picture elements) may configure the unit of display, a pixel or a picture element defined arbitrarily may configure the unit of display. The picture element includes any one of a red filter, a green filter and a blue filter, and has a polygonal shape having at least two parallel sides.

In each embodiment, the liquid crystal display device includes a carbon pigment light-shielding layer and an organic pigment light-shielding layer. At least one of the carbon pigment light-shielding layer and the organic pigment light-shielding layer forms a matrix of openings which sections the above described red filter, green filter and blue filter, respectively. A planar pattern of one of the carbon pigment light-shielding layer and the organic pigment light-shielding layer may be a striped pattern, or may be a matrix-like pattern. In planar view, any side of the polygon having at least two parallel sides can be formed by the carbon pigment light-shielding layer and the organic pigment light-shielding layer. For example, two sides of the rectangular opening may be sectioned by the carbon pigment light-shielding layer having a stripe pattern, four sides of the polygon may be formed by the organic pigment layer, and the carbon pigment light-shielding layer and the organic pigment light-shielding layer may overlap only in the two sides of the rectangular opening. In the present invention, in planar view, the matrix of the openings includes combinations of these various patterns.

The carbon pigment light-shielding layer contains carbon as a main material (main substance, main agent, or primary constituent) of the light-shielding color materials. The carbon pigment light-shielding layer may be omitted in an effective display region (image display portion) of a color filter substrate. The carbon pigment light-shielding layer may contain other light-shielding color materials which are not the main material.

In the respective embodiments, the main material is a pigment having a mass of over 50% in mass percentage relative to the mass of all of the pigments of the light-shielding color materials. That is, in the carbon pigment light-shielding layer, 50% or more of the mass of all of the pigments is the mass of carbon.

The carbon pigment light-shielding layer may be disposed on a surrounding area which is out of the effective display region and referred to as a frame, and may be used as alignment marks of the color filters. The frame is formed to surround the four sides of the effective display region. The liquid crystal on the frame may not be alignment-controlled sufficiently, which is likely to cause light leakage. Accordingly, the light-shielding layer forming the frame needs to have high light-shielding properties, for example, an optical density of 4, 5 or more. It is difficult for the organic pigment light-shielding layer to provide an optical density of 3 or more with a practical film thickness. However, the carbon pigment light-shielding layer can provide an optical density of 4 or more with a practical film thickness such as of 1 μm to 2 μm. The frame can be formed by a single layer of the carbon pigment light-shielding layer, or by a laminate structure of the carbon pigment light-shielding layer and the organic pigment light-shielding layer. The carbon pigment light-shielding layer may configure the frame, and only the organic pigment light-shielding layer may configure the matrix of the openings sectioning each of the red filter, the green filter and the blue filter.

The organic pigment light-shielding layer contains organic pigments as the main material of the light-shielding color materials. The organic pigment light-shielding layer, in planar view, includes an overlapping portion which overlaps the red filter, the green filter or the blue filter, for example, on at least one of the sides of the pixel, and does not overlap the carbon pigment light-shielding layer.

The organic pigment light-shielding layer 14 can be adjusted freely within a range where a violet organic pigment is 50 to 75%, a yellow organic pigment is 25 to 50% and a red organic pigment is 0 to 30% in mass percentage relative to the sum of the organic pigments.

In the respective embodiments, various liquid crystal driving methods may be used. For example, there can be used liquid crystal alignment methods or liquid crystal driving methods such as an IPS method (horizontal electric field method using horizontally-aligned liquid crystal molecules), VA (Vertically Alignment: vertical electric field method using vertically-aligned liquid crystal molecules), HAN (Hybrid-aligned Nematic), TN (Twisted Nematic), OCB (Optically Compensated Bend), and CPA (Continuous Pinwheel Alignment). The liquid crystal layer may contain a liquid crystal molecule having positive dielectric constant anisotropy, or may contain a liquid crystal molecule having negative dielectric constant anisotropy.

Rotation directions (movement directions) of the liquid crystal molecules when a liquid crystal drive voltage is applied may be directions parallel with the surface of the substrate, or may be directions standing perpendicular to the plane of the substrate. The direction of the liquid crystal drive voltage applied to the liquid crystal molecules may be a horizontal direction, may be a direction oblique two-dimensionally or three-dimensionally, or may be a vertical direction.

First Embodiment

In this embodiment, an IPS method is described as an example. However, the liquid crystal driving methods other than IPS methods may be used.

FIG. 1 is a partial cross-sectional view showing an example of configurations of a liquid crystal panel 2 included in a liquid crystal display device 1 according to the present embodiment.

FIG. 1 is a cross-sectional view viewed from the side of the picture element of the liquid crystal panel 2. In the liquid crystal panel 2, an alignment film, a polarization plate, a retarder and the like are omitted.

The liquid crystal display device 1 is according to an IPS method. The liquid crystal panel 2 includes an array substrate 3, a color filter substrate 4 and a liquid crystal layer 5.

The array substrate 3 and the color filter substrate 4 face each other. Between the array substrate 3 and the color filter substrate 4, the liquid crystal layer 5 is sandwiched. The liquid crystal layer 5 contains liquid crystal molecules having negative dielectric constant anisotropy. When the liquid crystal drive voltage is not applied, the liquid crystal molecules are aligned parallel to the respective substrate surfaces of the array substrate 3 and the color filter substrate 4. However, the liquid crystal layer 5 may contain liquid crystal molecules having positive dielectric constant anisotropy.

The array substrate 3 includes a transparent substrate 6, insulating layers 7a to 7c, a common electrode 8 and pixel electrodes 9.

The insulating layers 7a and 7b are formed on a first surface of the transparent substrate 6. The common electrode 8 is formed on the insulating layer 7b. The insulating layer 7c is formed on the insulating layer 7b on which the common electrode 8 is formed. The pixel electrodes 9 are formed on the insulating layer 7c.

For the insulating layers 7a to 7c, for example, SiN is used.

The pixel electrode 9 may have a comb-like pattern, a strip-shaped or linear pattern.

The common electrode 8 faces the pixel electrodes 9 through the insulating layer 7c in the direction perpendicular to the plane of the transparent substrate 6.

The pixel electrode 9 and the common electrode 8 may contain an electrically-conductive metal oxide. As the electrically-conductive metal oxides, for example, a transparent electrically-conductive (ITO) film can be used.

The pixel electrodes 9 and the common electrode 8 are formed through the insulating layer 7c. On the basis of the liquid crystal drive voltage applied to between the pixel electrode 9 and the common electrode 8, the liquid crystal molecules of the liquid crystal layer 5 are driven. When the liquid crystal drive voltage is applied, the longitudinal axes of the liquid crystal molecules rise from the horizontal direction to the vertical direction.

A second surface of the transparent substrate 6 included in the array substrate 3 is positioned inside the liquid crystal display device 1, and positioned in the back side of the liquid crystal panel 2. The pixel electrodes 9 included in the array substrate 3 is disposed to the liquid crystal layer 5.

The color filter substrate 4 includes a transparent substrate 10, a color filter layer 12 having a carbon pigment light-shielding layer 11 and color filters CF, a transparent resin middle layer 13, an organic pigment light-shielding layer 14, and a transparent resin layer 15.

The carbon pigment light-shielding layer 11 containing carbon as the main material of the light-shielding color materials is formed on a first surface of the transparent substrate 10. The color filters CF are formed on the first surface of the transparent substrate 10 on which the carbon pigment light-shielding layer 11 is formed. The transparent resin middle layer 13 is formed on the color filter layer 12. The organic pigment light-shielding layer 14 containing organic pigments as the main material of the light-shielding color materials is formed on the transparent resin middle layer 13. The transparent resin layer 15 is formed on the transparent resin middle layer 13 on which the organic pigment light-shielding layer 14 is formed.

A second surface of the transparent substrate 10 included in the color filter substrate 4 is disposed on the top surface of the liquid crystal display device 1. The transparent resin layer 15 included in the color filter substrate 4 is disposed on the liquid crystal layer 5.

In formation of the color filter layer 12, patterns of red filters RF, green filters GF and blue filters BF are formed in polygonal pixel shapes on the carbon pigment light-shielding layer 11.

As described above, the formation of the carbon pigment light-shielding layer 11 may be omitted, or it may be formed only on the frame region of the liquid crystal panel 2. In FIG. 1, there is shown the structure where the carbon pigment light-shielding layer 11 and the organic pigment light-shielding layer 14 are disposed to overlap each other. However, the layers 11 and 14 do not always have to be overlapped.

The transparent resin middle layer 13 is formed such as to cover the patterns formed by the red filters RF, the green filters GF and the blue filters BF. If the transparent resin middle layer 13 has no need for being thick, such as when the color filter substrate 4 is included in a liquid crystal display device 1 for the use without stereoscopic display, the transparent resin middle layer 13 may be omitted.

If the liquid crystal display device performs stereoscopic display, it is preferred that a thickness (distance) needed for obtaining oblique emitted light is provided between the carbon pigment light-shielding layer 11 and the organic pigment light-shielding layer 14.

In the present embodiment, the organic pigment light-shielding layer 14 is also formed on the transparent resin middle layer 13. The transparent resin layer 15 is formed on the organic pigment light-shielding layer 14. The transparent resin layer 15 makes the color filter substrate 4 flat and serves as a protection cover of the color filter substrate 4.

Like the present embodiment, the color filter substrate 4 of the liquid crystal display device 1 according to the IPS method may have no transparent electrode. However, if the color filter substrate 4 is included in the liquid crystal display device 1 according to the VA (vertical alignment) method and a vertical electric field method, a transparent electrically-conductive film or transparent electrically-conductive film pattern such as of ITO may be formed on the transparent resin layer 15.

The carbon pigment light-shielding layer 11 may include, for example, a linear pattern extending toward a lengthwise direction which is a longitudinal direction to divide the first surface of the transparent substrate 10 in a traverse direction in planar view. However, the shape of the carbon pigment light-shielding layer 11 is not limited to this. For example, the carbon pigment light-shielding layer 11 may form a plurality of openings disposed in a matrix, or may be formed into a rectangle including two or more parallel sides.

The color filters CF including the red filters RF, the green filters GF and the blue filters BF cover the first surface of the transparent substrate 10 on which the carbon pigment light-shielding layer 11 is formed. In other words, in planar view, in the direction perpendicular to the plane of the transparent substrate 10, the carbon pigment light-shielding layer 11 and the ends of the red filter RF, the green filter GF and the blue filter BF overlap each other.

The organic pigment light-shielding layer 14 sections the surface of the transparent resin middle layer 13 into a matrix to form the plurality of the openings arranged with a matrix. The opening has, in planar view, a pixel shape, for example, has a rectangular shape including two or more parallel sides. Any one of the red filters RF, the green filters GF and the blue filters BF are assigned to each of the openings. However, the shape of the organic pigment light-shielding layer 14 is not limited to this. For example, the shape of the organic pigment light-shielding layer 14 may be formed into a linear pattern as the same as the carbon pigment light-shielding layer 11.

According to the present embodiment, the carbon pigment light-shielding layer 11 and the organic pigment light-shielding layer 14 partially overlap each other in planar view.

In this embodiment, an arbitrarily thickness (distance) can be provided between the carbon pigment light-shielding layer 11 and the organic pigment light-shielding layer 14. In this case, the organic pigment light-shielding layer 14 is a light-shielding layer closer to the liquid crystal layer 5 than the carbon pigment light-shielding layer 12 is. In the liquid crystal driving methods where the liquid crystal molecule rotates horizontally relative to the substrate plane, such as FFS and IPS, the organic pigment light-shielding layer being closer to the liquid crystal layer 5 provides the following merits. In the drive of the liquid crystal molecule according to FFA or IPS, when the drive voltage is applied to the liquid crystal layer 5, a propagation distance of rotation of the liquid crystal molecules is sometimes long, this effect of the propagation distance reaches the adjacent pixels to which the liquid crystal drive voltage is not applied, and light leak sometimes occurs at the end of the adjacent pixels. In a fine pixel, the light leak sometimes causes display quality to lower. However, in the present embodiment, by disposing the organic pigment light-shielding layer 14 closer to the liquid crystal layer 5, the light leak toward oblique direction occurring at the end of the adjacent pixels can be reduced significantly.

In the present embodiment, the liquid crystal panel 2 includes the effective display region where the plurality of pixels are arranged in a matrix-like shape, and the frame region which is an outer periphery portion of the effective display region and out of the effective display region.

In the present embodiment, for example, the frame region may have a double layer structure where the carbon pigment light-shielding layer 11 and the organic pigment light-shielding layer 14 overlap each other. This can increases the light-shielding properties in the frame region.

Figure 2:
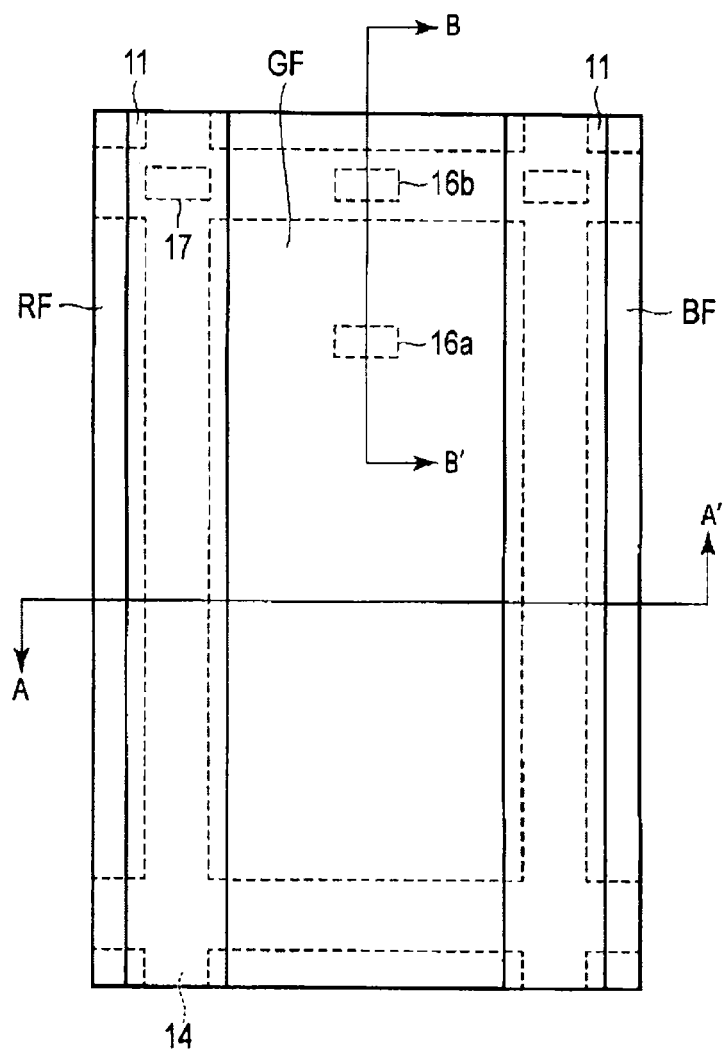
FIG. 2 is a plan view showing an example of a structure of the liquid crystal panel according to the first embodiment, the structure being viewed from over a color filter substrate.

FIG. 2 is a plan view showing an example of a structure of the liquid crystal panel 2 according to the present embodiment, the structure being viewed from over the color filter substrate 4. FIG. 2 shows the green pixel GF. FIG. 2 is a plan view of the color filter substrate 4 viewed from an observer. FIG. 1 corresponds to the cross-section of FIG. 2 taken from A-A'.

Figure 3:
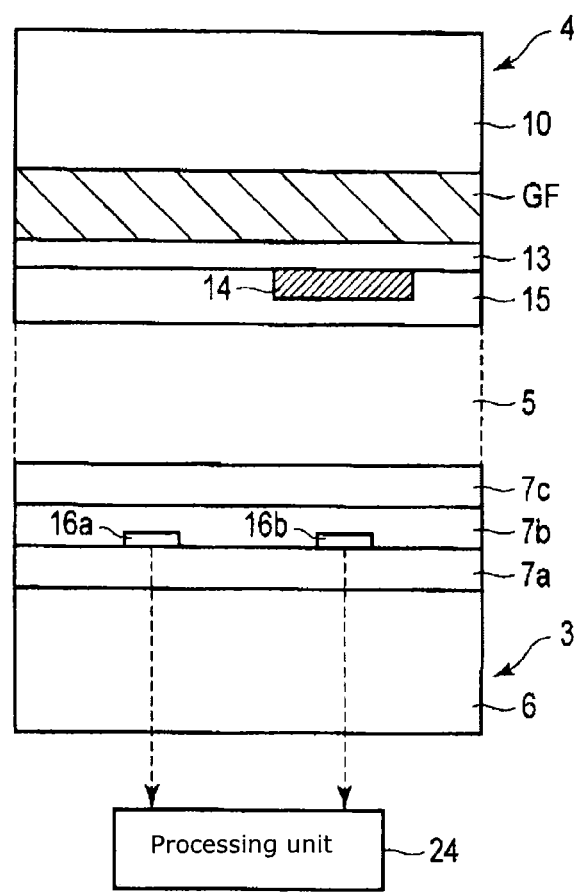
FIG. 3 is a partial cross-sectional view in a longitudinal direction showing an example of the liquid crystal panel according to the first embodiment.

FIG. 3 is a partial and longitudinal cross-sectional view showing an example of the liquid crystal panel 2 according to the present embodiment. FIG. 3 corresponds to the cross-section of FIG. 2 taken from B-B'. FIG. 3 is a cross-sectional view viewed from the longitudinal direction of the green pixel.

As described above, the carbon pigment light-shielding layer 11 has a linear pattern, and the organic pigment light-shielding layer 14 has a rectangular pattern. The carbon pigment light-shielding layer 11 overlaps the lateral sides of the organic pigment light-shielding layer 14.

A light sensor (a first light sensor) 16a is provided below the green filter GF of the green pixel.

Another light sensor (a second light sensor) 16b is provided below the organic light-shielding layer 14.

The light sensors 16a and 16b are, for example, light receiving elements.

A liquid crystal driving element 17 is provided below the carbon pigment light-shielding layer 11 at the corner of the green pixel. The liquid crystal driving element 17 is electrically connected to the pixel electrode 9. As the liquid crystal driving element 17, for example, a thin film transistor (TFT) is used.

Figure 4:
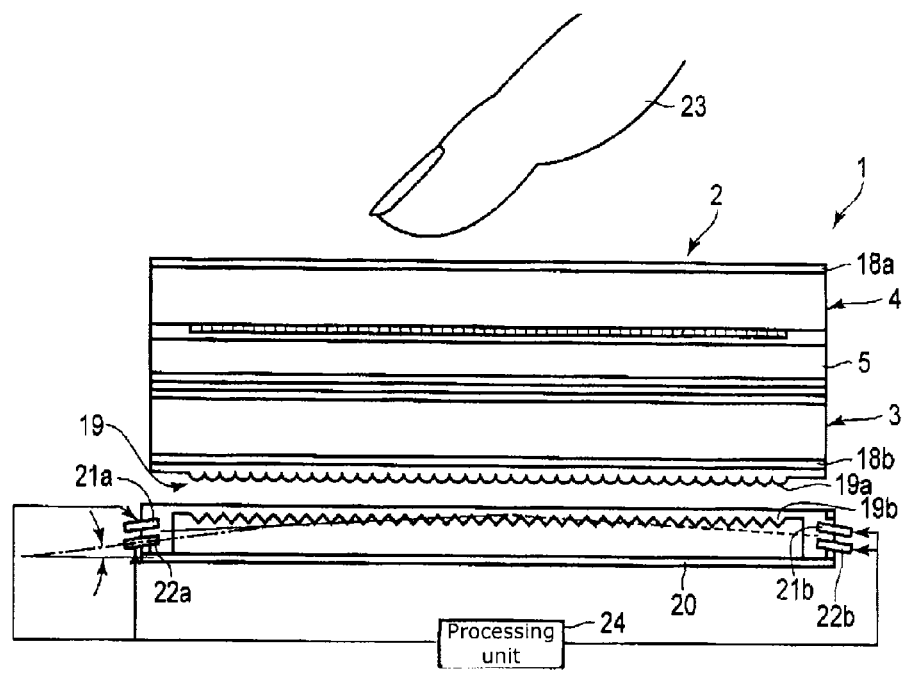
FIG. 4 is a cross-sectional view showing an example of the liquid crystal display device according to the first embodiment.

FIG. 4 is a cross-sectional view showing an example of the liquid crystal display device 1 according to the present embodiment. FIG. 4 is a cross-sectional view viewed from the lateral direction of the liquid crystal display device 1.

The liquid crystal display device 1 includes a liquid crystal panel 2, polarization plates 18a and 18b, a light controlling element 19 having, for example, semicircular column lenses 19a and triangular prisms 19b, and a backlight unit 20.

The polarization plate 18a is provided on the top surface (the second surface of the transparent substrate 10) of the liquid crystal panel 2.

The polarization plate 18b is provided on the back surface (the second surface of the transparent substrate 6) of the liquid crystal panel 2.

The backlight unit 20 is provided on the back surface of the liquid crystal panel 2 through the polarization plate 18b.

The backlight unit 20 may include, for example, a diffuser panel, a light guide plate, a polarization split film, a retrorefrection polarization element and the like, but they are omitted in FIG. 4.

The backlight unit 20 includes a plurality of solid-state light emitting elements 21a and 21b emitting visible light, and a plurality of solid-state light emitting elements 22a and 22b emitting infrared rays or ultraviolet rays.

The solid-state light emitting elements 21a and 21b may be, for example, white LEDs emitting white light whose emitting wave length range includes three wave lengths of red, green and blue. The solid-state light emitting elements 21a and 21b may be quasi-white LEDs which are combinations of GaN blue LED and YAG phosphor. In order to increase color rendering properties, an LED having main peak of one or more color such as a red LED may be used with a quasi-white LED. As the solid-state light emitting elements 21 and 21b, for example, a light source where a red phosphor and a green phosphor are stacked on a blue LED may be used.

Infrared ray, which is invisible light, is used as an illumination light for a pointer 23 such as a finger operating the surface of the liquid crystal display. If the light sensor 16b is used as a light-receiving element for touch-sensing with near-infrared light, the light sensor 16b receives the reflected light (for example, infrared light) from the pointer 23 to realize touch-sensing, thereby the position and movement of the pointer 23 can be detected. As the light sensor 16b, for example, an imaging element such as a CMOS or a CCD can be used. As the alternatives for the light sensor 16b, a camera provided with a CMOS sensor or CCD sensor can be used.

In touch-sensing by the liquid crystal display device 1, for example, near-infrared light is emitted from the solid-state light emitting elements 22a and 22b that emit near-infrared light having a light wavelength of 700 nm to 1100 nm. This near-infrared light is emitted from the backlight unit 20 through the top surface of the liquid crystal panel 2, and illuminates the pointer 23. The re-reflected light from the pointer 23 is received by the light sensor 16b, and this acceptance of the light enables touch-sensing. The touch-sensing timing and the emission timing of the near-infrared light is preferred to be synchronized with each other by a processing unit 24. However, for example, if the near-infrared light which has a longer wave length than 800 nm and difficult for humans to see is used, it may be emitted continuously. Further, in color-separation of blue, green and red, it is preferred to use a near-infrared light having a longer light wavelength than light wavelength 800 nm, the near-infrared light having less effect on color-separation.

The destination of the emitted light can be controlled to match the position of the eyes of an observer or the position of the pointer 23 by adjusting the light emission angle θ of the solid-state light emitting elements 21a, 21b, 22a and 22b.

Figure 5:
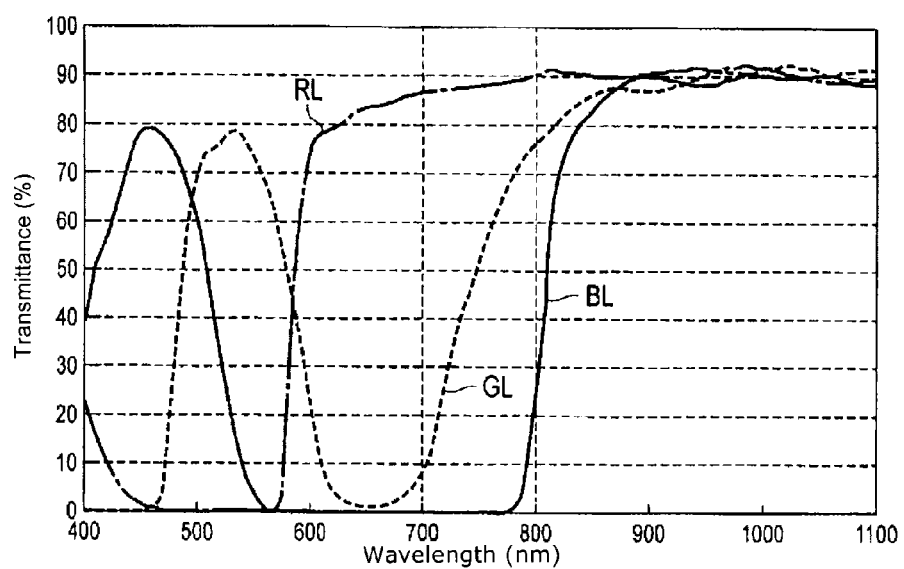
FIG. 5 is a graph showing an example of spectroscopic characteristics of the color filter according to the first embodiment.

FIG. 5 is a graph showing an example of spectroscopic characteristics of the color filters CF according to the present embodiment.

The color filters CF employed in the liquid crystal display device 1 include the red filters RF, the green filters GF and the blue filters BF. The characteristics RL are spectroscopic characteristics of the red filter RF. The characteristics GL are spectroscopic characteristics of the green filter GF. The characteristics BF are spectroscopic characteristics of the blue filter BF.

Transmittances of the red filter RF, the green filter GF and the blue filter BF are significantly different from each other in the wavelength region longer than the light wavelength of 700 nm.

Accordingly, in a case where the liquid crystal display device 1 having the light sensor 16a is used as a color copy machine or an imaging device, for example, unless the received light component is not removed in wavelength of a near-infrared region of 700 nm to 1100 nm, highly accurate color separation of red, green and blue is difficult.

The semiconductors contained in a thin film transistor, such as amorphous silicon or polysilicon, detect light in a wavelength region of about light wavelength 400 nm to 1100 nm.

Figure 6:
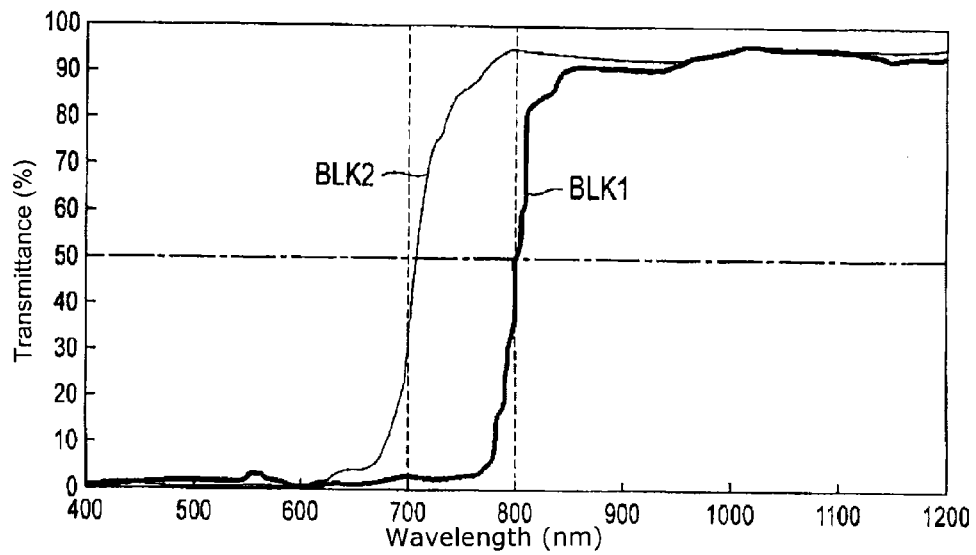
FIG. 6 is a graph showing an example of light-shielding characteristics of a carbon pigment light-shielding layer and an organic pigment light-shielding layer.

FIG. 6 is a graph showing an example of light-shielding characteristics BLK1 of the carbon pigment light-shielding layer 11 according to the present embodiment and light-shielding characteristics BLK2 of the organic pigment light-shielding layer 14.

The carbon pigment light-shielding layer 11 contains carbon as a main color material having light-shielding properties. The carbon pigment light-shielding layer 11 can prevent light from passing therethrough in a wider wavelength region than the organic pigment light-shielding layer 14 does.

The transmittance of the organic pigment light-shielding layer 14 rises at the vicinity of light wavelength about 700 nm, and becomes high in a longer wavelength region than the vicinity of light wavelength 700 nm. In other words, the transmittance of the organic pigment light-shielding layer 14 has a tendency for the transmittance to become high in a region of 670 nm to 800 nm, for example, and the transmittance becomes 50% at a wavelength in this wavelength region. It has transmission characteristics where the transmittance becomes higher in a longer wavelength region than the wavelength at which the transmittance is 50%. In the descriptions of the present invention, the wavelength at which the transmittance of the organic pigment light-shielding layer 14 is 50% is defined as half-value wavelength.

Figure 7:
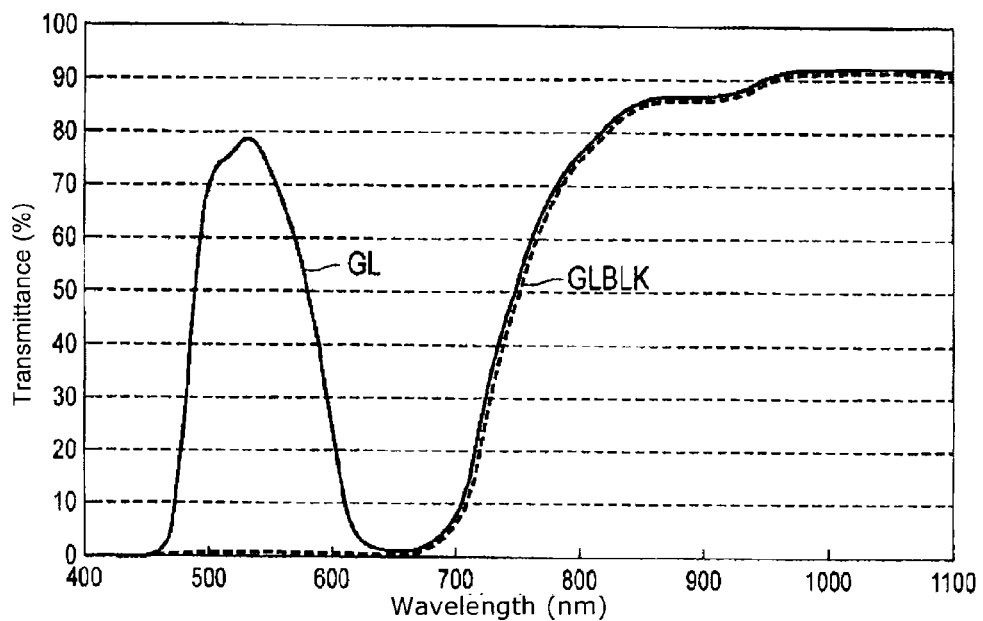
FIG. 7 is a graph showing an example of transmission characteristics of a green filter and transmission characteristics of the overlapped green filter and organic pigment light-shielding layer.

FIG. 7 is a graph showing an example of transmission characteristics GL of the green filter GF and transmission characteristics GLBLK of the overlapped green filter GF and organic pigment light-shielding layer 14.

Highly-accurate detection data of green in the visible light region is obtained by subtracting, from the detection data of the light detected through the green filter GF, the detection data of the light detected by optically overlapping the green filter GF and the organic pigment light-shielding layer 14.

Thus, by subtracting, from the detection data of the light detected through the green filter GF, the detection data of the light detected by optically overlapping the green filter GF and the organic pigment light-shielding layer 14, the detection data of only green light in the visible light region can be extracted.

Figure 8:
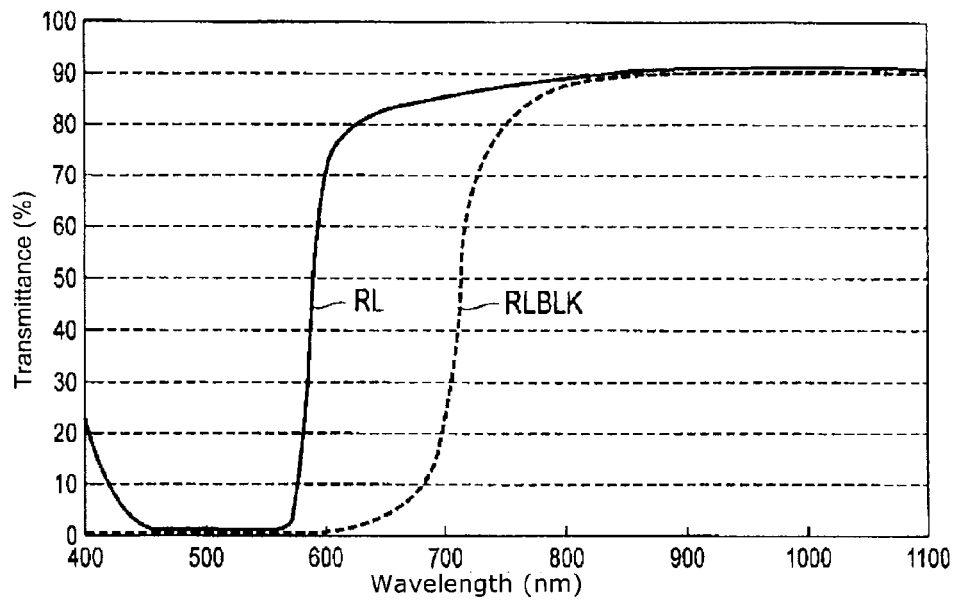
FIG. 8 is a graph showing an example of transmission characteristics of a red filter and transmission characteristics of the overlapped red filter and organic pigment light-shielding layer.

FIG. 8 is a graph showing an example of transmission characteristics RL of the red filter RF and transmission characteristics RLBLK of the overlapped red filter RF and organic pigment light-shielding layer 14.

The portion where each unicolor layer of the red filter RF, the green filter GF and the blue filter BF included in the color filters CF is layered on the organic pigment light-shielding layer 14 for detecting light may be referred to as an optically overlapped portion.

Highly-accurate detection data of red in the visible light region is obtained by subtracting, from the detection data of the light detected through the red filter RF, the detection data of the light detected by optically overlapping the red filter RF and the organic pigment light-shielding layer 14.

Thus, by subtracting, from the detection data of the light detected through the red filter RF, the detection data of the light detected by optically overlapping the red filter RF and the organic pigment light-shielding layer 14, the detection data of only red in the visible light region can be extracted.

Figure 9:
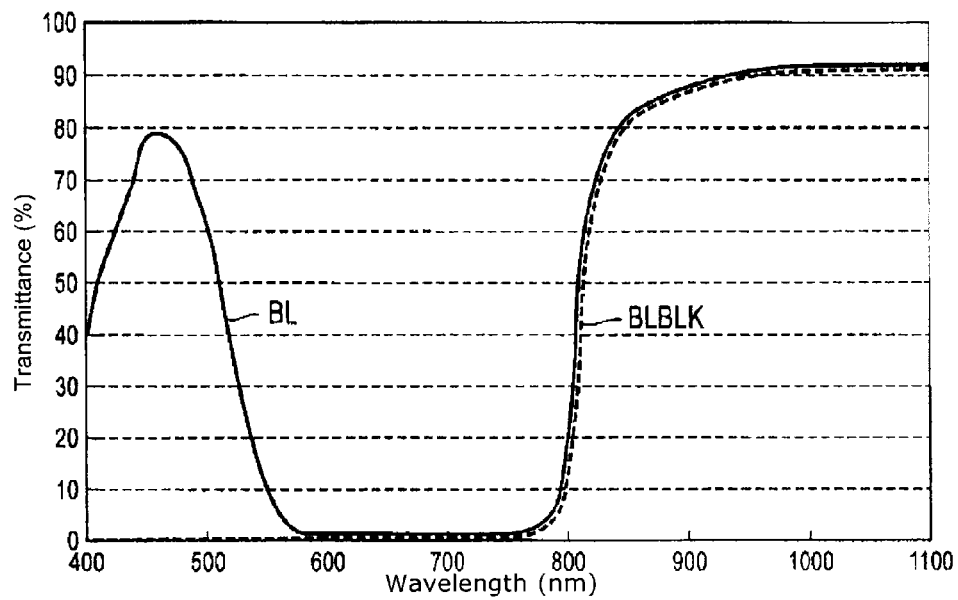
FIG. 9 is a graph showing an example of transmission characteristics of a blue filter and transmission characteristics of the overlapped blue filter and organic pigment light-shielding layer.

FIG. 9 is a graph showing an example of transmission characteristics BL of the blue filter BF and transmission characteristics BLBLK of the overlapped blue filter BF and organic pigment light-shielding layer 14.

Highly-accurate detection data of blue in visible light region is obtained by subtracting, from the detection data of the light detected through the blue filter BF, the detection data of the light detected by optically overlapping the blue filter BF and the organic pigment light-shielding layer 14.

Thus, by subtracting, from the detection data of the light detected through the blue filter BF, the detection data of the light detected by optically overlapping the blue filter BF and the organic pigment light-shielding layer 14, the detection data of only blue in the visible light region can be extracted.

This subtraction is performed, for example, by the above-described processing unit 24 as shown in FIG. 3. The light sensor 16a generates detection data of light passing through the green filer GF. The light sensor 16b generates detection data of light passing through the green filter GF and the organic pigment light-shielding layer 14.

The detection data from the light sensor 16a includes a sensed light component of green and a sensed light component of near-infrared region. However, the processing unit 24 can extract the detection data of only the green component in the visible light region by subtracting, from the detection data from the light sensor 16a, the detection data from the light sensor 16b.

By replacing the above-described green filter GF of FIG. 3 with the red filter RF or the blue filter BF, the detection data of the red component in the visible light region and the detection data of the blue component in the visible light region can be extracted respectively.

As the light sensors 16a and 16b used for separation of light in a wide range, silicon-based photodiode is selected. The silicon-based photodiode can have pin or pn structure. Regarding the incidence direction of light, in view of efficiency, light is preferred to enter into a p-type semiconductor surface. However, regarding the incidence direction of light, light may enter into an n-type semiconductor surface, as needed. A p-type semiconductor film may be formed, for example, by plasma CVD using a semiconductor material gas containing boron (B). An n-type semiconductor film may be formed, for example, by plasma CVD using a semiconductor material gas containing phosphorus (P). An i-type semiconductor film may be formed by plasma CVD using a semiconductor material gas which does not contain these impurities. These semiconductor films may be amorphous silicon, polysilicon or semi-amorphous.

The light sensors 16a and 16b made of these silicone semiconductors can be switched by a thin film transistor where a transparent channel layer is made of a metal oxide. Alternatively, the light sensors 16a and 16b made of silicon semiconductors can be switched by a thin film transistor made of amorphous silicon or polysilicon. Silicon may continuously change in film quality from amorphous to polysilicon. For example, if a thin film transistor is provided with a transparent channel layer containing metallic oxides of two or more types of gallium, indium, zinc, tin, hafnium and yttrium, the thin film transistor has high mobility and small leak current. Accordingly, this thin film transistor can switch at high speed and with low power consumption. If the light sensors 16a and 16b are switched by the thin film transistor having the transparent channel layer containing the metal oxide, intensity distribution of light detected by the light sensors 16a and 16b can be converted into electric signals with good repeatability and small variations. Here, switching of the light sensors 16a and 16b means selection of the light sensors 16a and 16b by the thin film transistor or reset of the light sensors 16a and 16b by the thin film transistor. In the present embodiment, output wires of the light sensors 16a and 16b are connected to a source electrode or a drain electrode of the thin film transistor, and the thin film transistor may be used as an element of an amplifier circuit.

In the present embodiment described above, the liquid crystal panel 2 has a touch-sensing function, which enables reduction in thickness and weight.

In the present embodiment, data detected through the color filters CF and the organic pigment light-shielding layer 14 is subtracted from data detected through the color filters CF. This can stabilize the detection results highly accurately, enables highly-accurate color-separation, and can realize highly-accurate touch sensing.

Second Embodiment

In the present embodiment, a modification of the foregoing first embodiment is described.

Figure 10:
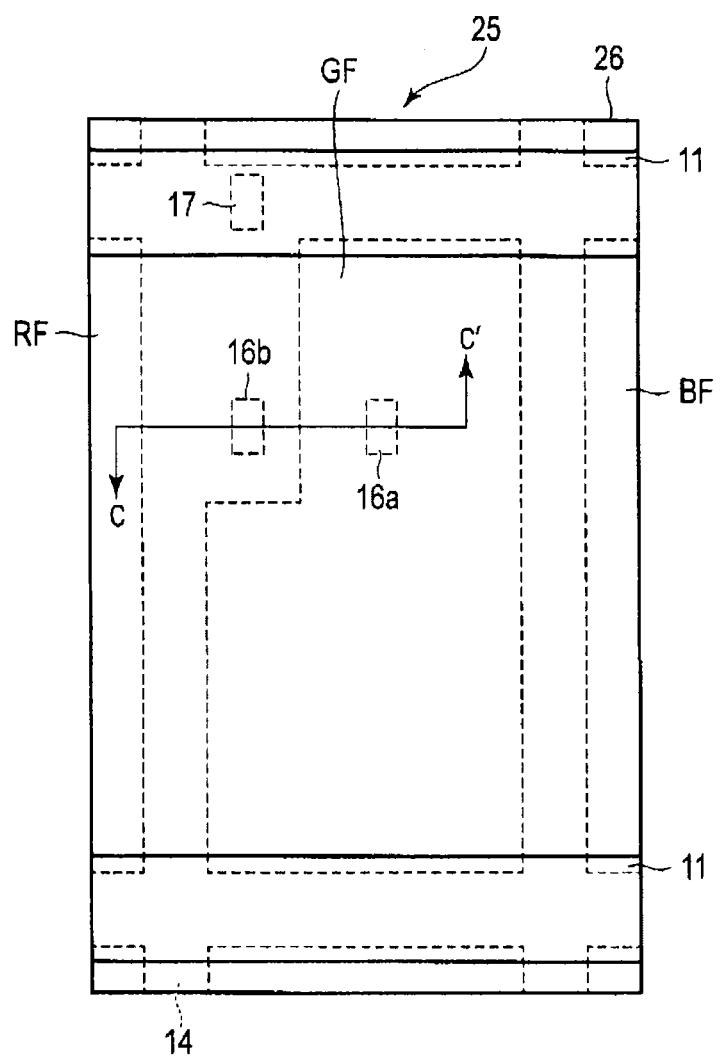
FIG. 10 is a partial plan view showing an example of a structure of a liquid crystal panel according to a second embodiment of the present invention, the structure being viewed from over a color filter substrate.

FIG. 10 is a partial plan view showing an example of a structure of a liquid crystal panel 25 according to the present embodiment, the structure being viewed from over a color filter substrate 26. FIG. 10 shows a green pixel.

Figure 11:
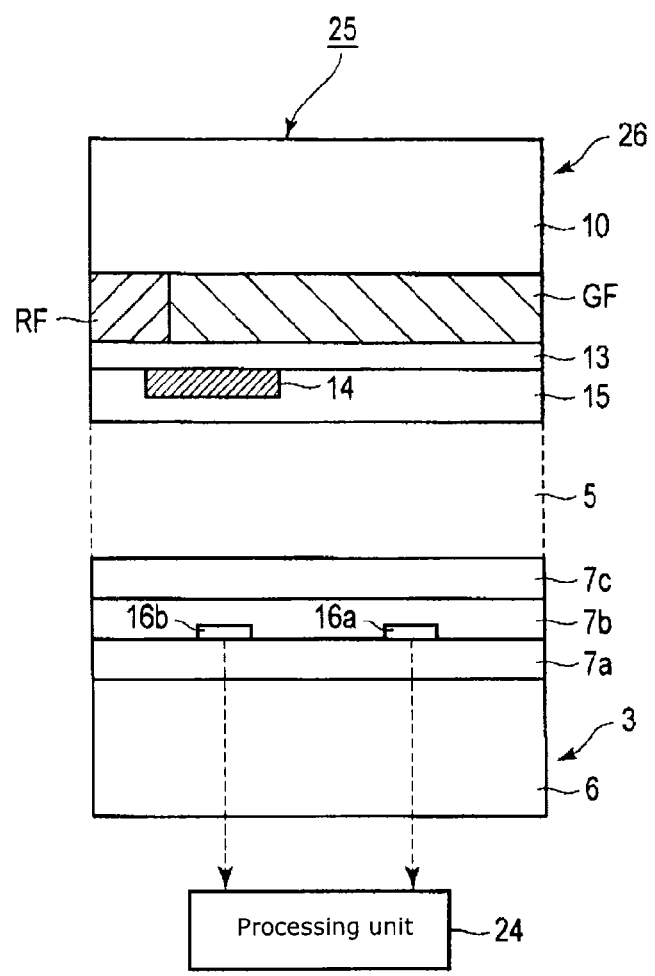
FIG. 11 is a partial transverse sectional view showing an example of the liquid crystal panel according to the second embodiment.

FIG. 11 is a partial transverse sectional view showing an example of the liquid crystal panel 25 according to the present embodiment. FIG. 11 corresponds to the sectional view of FIG. 2 taken from C-C'. FIG. 3 is a sectional view viewed from the side direction of the green pixel.

The carbon pigment light-shielding layer 11 has a linear pattern, and the organic pigment light-shielding layer 14 has a substantially rectangular matrix pattern. The carbon pigment light-shielding layer 11 overlaps the upper side and lower side of the organic pigment light-shielding layer 14.

The light sensor 16a is provided below the green filter GF. The light sensor 16b is provided below the green filter GF and the organic pigment light-shielding layer 14.

A liquid crystal driving element 17 electrically connected to the pixel electrode 9 is provided below the carbon pigment light-shielding layer 11 formed at the corner of the green pixel. As the liquid crystal driving element 17, for example, a thin film transistor is used.

The green filter GF and the light sensor 16a overlap each other in the direction (light incident direction) perpendicular to the substrate plane.

The green filter GF, the organic pigment light-shielding layer 14 and the light sensor 16b overlap each other in the direction perpendicular to the substrate plane.

The light sensor 16a detects the sensed light component of green and the sensed light component of near-infrared region. The light sensor 16b detects the sensed light component of near-infrared region. The processing unit 24 subtracts the detection data of the light sensor 16b from the detection data of the light sensor 16a to generate data of only the green component.

By replacing the green filter GF of FIG. 11 with the red filter RF or the blue filter BF, the data of only the red component or the data of only the blue component can be generated.

Third Embodiment

In the present embodiment, a modification of the foregoing first and second embodiments is described.

Figure 12:
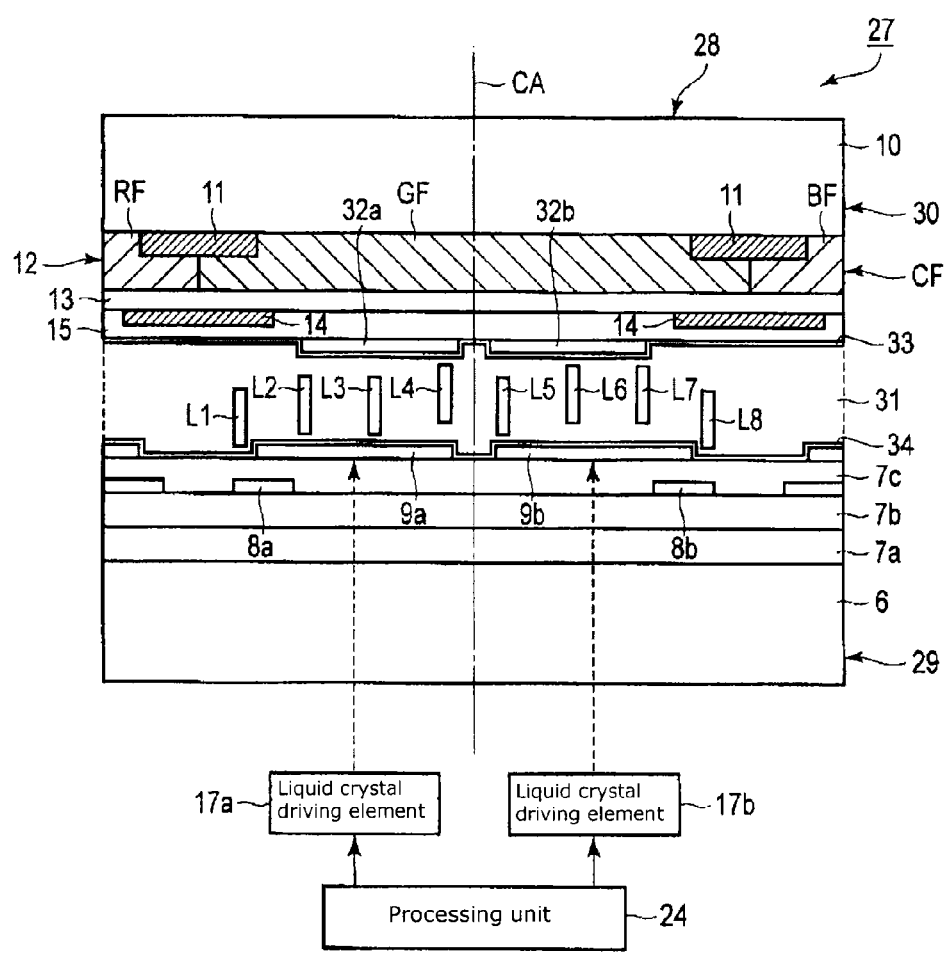
FIG. 12 is a partial sectional view showing an example of a configuration of a liquid crystal panel provided in a liquid crystal display device according to a third embodiment.

FIG. 12 is a partial sectional view showing an example of a configuration of a liquid crystal panel 28 provided in a liquid crystal display device 27 according to the present embodiment. In the liquid crystal panel 28 according to the present embodiment, a polarization plate, a retarder, and the like are omitted.

The liquid crystal panel 28 includes an array substrate 29, a color filter substrate 30 and a liquid crystal layer 31.

The array substrate 28 faces the color filter substrate 30. Between the array substrate 29 and the color filter substrate 30, the liquid crystal layer 31 is sandwiched. In the present embodiment, the liquid crystal layer 31 contains liquid crystal molecules L1 to L8 having negative dielectric constant anisotropy. The liquid crystal molecules L1 to L8 are initially vertically aligned. The liquid crystal molecules L1 to L8 are driven based on an oblique electric field.

The color filter substrate 30 has the transparent substrate 10, the color filter layer 12 including the carbon pigment light-shielding layer 11 and the color filter layer CF, the transparent resin middle layer 13, the organic pigment light-shielding layer 14, the transparent resin layer 15, counter electrodes 32a and 32b, and an alignment film 33. In the present embodiment, the transparent resin middle layer 13 may be omitted.

The counter electrodes 32a and 32b are formed on the transparent resin layer 15 of the color filter substrate 30.

The alignment film 33 is formed on the transparent resin layer 15 on which the counter electrodes 32a and 32b are formed.

The alignment film 33 included in the color filter substrate 30 is positioned to the liquid crystal layer 31.

The array substrate 29 includes the transparent substrate 6, the insulating layers 7a to 7c, the pixel electrodes 9a and 9b, common electrodes 8a and 8b and the alignment film 34.

The common electrodes 8a and 8b are formed on the insulating layer 7b of the array substrate 29. The insulating layer 7c is formed on the insulating layer 7b where the common electrodes 8a and 8b are formed. The pixel electrodes 9a and 9b are formed on the insulating layer 7c. The alignment film 34 is formed on the insulating layer 7c where the pixel electrodes 9a and 9b are formed.

The alignment film 34 may provide the liquid crystal molecules L1 to L8 with vertical alignment at 90 degrees to the substrate plane. The alignment film 34 may provide pretilt angles which are line-symmetric with respect to a pixel center line CA. The pretilt angle may be defined as inclination of the liquid crystal molecules L1 to L8 from the direction perpendicular to the substrate plane.

In a process for setting the pretilt angle, for example, the light-sensitive alignment films 33 and 34 are formed on the color filter substrate 30 and the array substrate 29 respectively, the color filter substrate 30 and the array substrate 29 are layered on each other with the liquid crystal layer 31 therebetween, and voltage is applied. The voltage is applied between the pixel electrodes 9a, 9b and the common electrodes 8a, 8b, and between the pixel electrodes 9a, 9b and the counter electrodes 32a, 32b, and an alignment process is performed by exposure with radiant light such as ultraviolet light. Setting the pretilt angle may be carried out by a physical method such as rubbing.

The pixel electrodes 9a and 9b, the common electrodes 8a and 8b, and the counter electrodes 32a and 32b may have, for example, a comb-like pattern, a strip-shaped or a linear pattern.

The common electrodes 8a and 8b face the pixel electrodes 9a and 9b though the insulating layer 7c in the direction perpendicular to the substrate plane.

The counter electrodes 32a and 32b, the pixel electrodes 9a and 9b, and the common electrodes 8a and 8b may contain an electrically-conductive metallic oxide. As the electrically-conductive metallic oxide, for example, a transparent electrically-conductive film is used.

The counter electrodes 32a and 32b and the common electrodes 8a and 8b may be set to be a common electric potential (ground).

Figure 13:
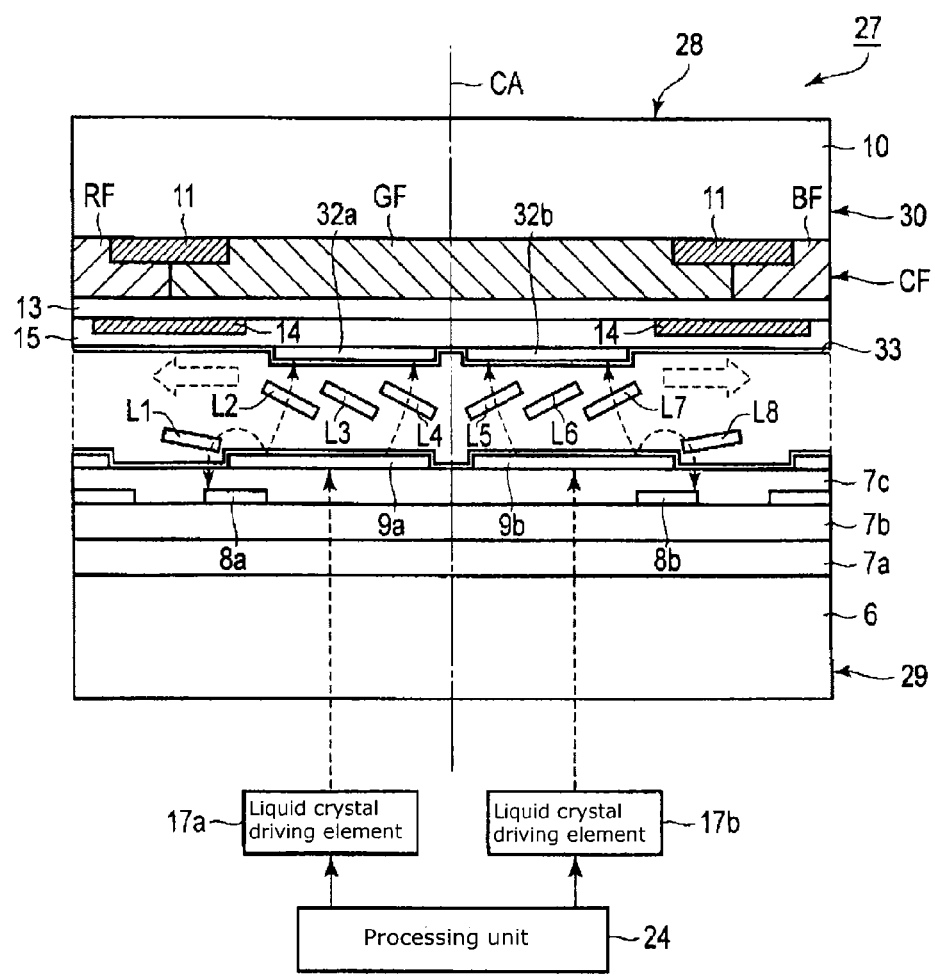
FIG. 13 is a partial sectional view showing an example of a state of the liquid crystal panel according to the third embodiment when the liquid crystal drive voltage is applied.

FIG. 13 is a partial sectional view showing an example of a state of the liquid crystal panel 28 according to the present embodiment when the liquid crystal drive voltage is applied.

In the sectional view as shown in FIG. 3, the counter electrodes 32a and 32b, the pixel electrodes 9a and 9b, and the common electrodes 8a and 8b are disposed line-symmetric with respect to the pixel center line CA.

The counter electrodes 32a and 32b are line-symmetrically displaced from the pixel electrodes 9a and 9b closer to the pixel center line CA. Thus, the positions of the counter electrodes 32a and 32b are horizontally displaced from the positions of the pixel electrodes 9a and 9b, which enables generation of an oblique electric field between the counter electrodes 32a and 32b and the pixel electrodes 9a and 9b. The oblique electric field makes the liquid crystal molecules L1 to L8 inclined from the pixel center line CA toward the ends of the pixel (the formed position of the carbon pigment light-shielding layer 11 and the organic pigment light-shielding layer 14) line-symmetrically (opposite directions between the left side and right side of the pixel).

Setting the pretilt angle can lower the voltage Vth at which the liquid crystal molecules L1 to L8 start to incline. In the vertical alignment, even if the pretilt angle is not set, the oblique electric field can make the liquid crystal molecules L1 to L8 inclined from the pixel center line CA toward the ends of the pixel line-symmetrically (opposite directions between the left side and right side of the pixel).

The counter electrodes 32a and 32b of the color filter substrate 30 may be a fully-formed film which is formed on the whole surface of the transparent resin layer 15 and is not patterned.

The array substrate 29 may include the pixel electrodes 9a and 9b for each pixel. The positions of the pixel electrodes 9a and 9b are horizontally displaced from those of the common electrodes 8a and 8b. Specifically, the common electrodes 8a and 8b include a portion protruding toward the direction from the pixel center line CA to the ends of the pixel line-symmetrically.

If the liquid crystal drive voltage is applied between the pixel electrodes 9a, 9b and the common electrodes 8a, 8b, an effectively strong electric field is produced between the pixel electrodes 9a, 9b and the common electrodes 8a, 8b, which causes the liquid crystal molecules L1 and L8 at the vicinity of the protruding portion of the common electrodes 8a and 8b to rapidly incline.

Figure 14:
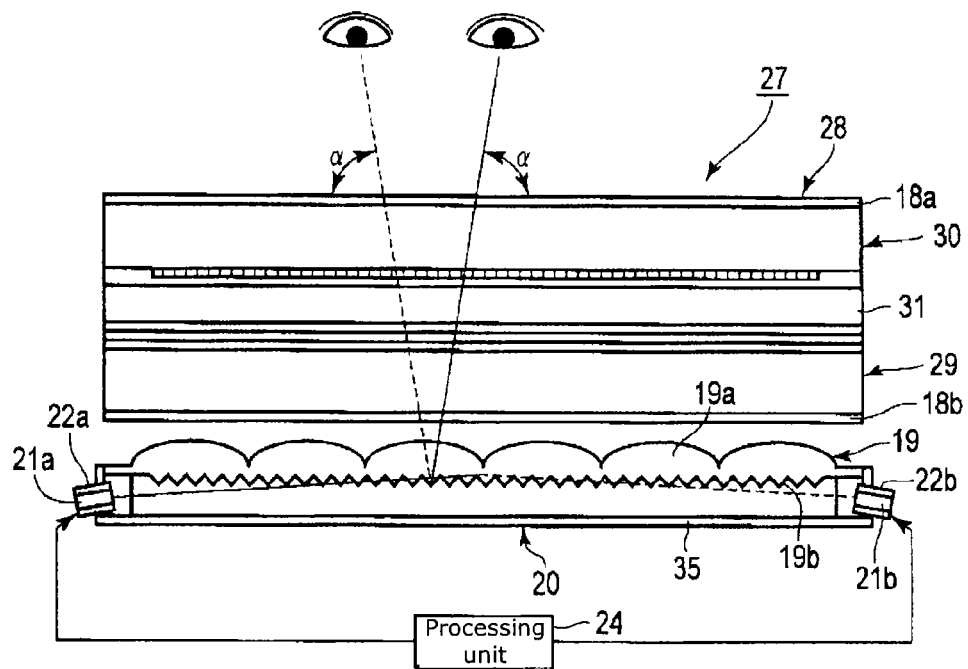
FIG. 14 is a sectional view showing an example of a configuration of the liquid crystal display device for displaying 3D images according to the third embodiment.

FIG. 14 is a sectional view showing an example of a configuration of the liquid crystal display device 27 for displaying 3D images.

Figure 15:
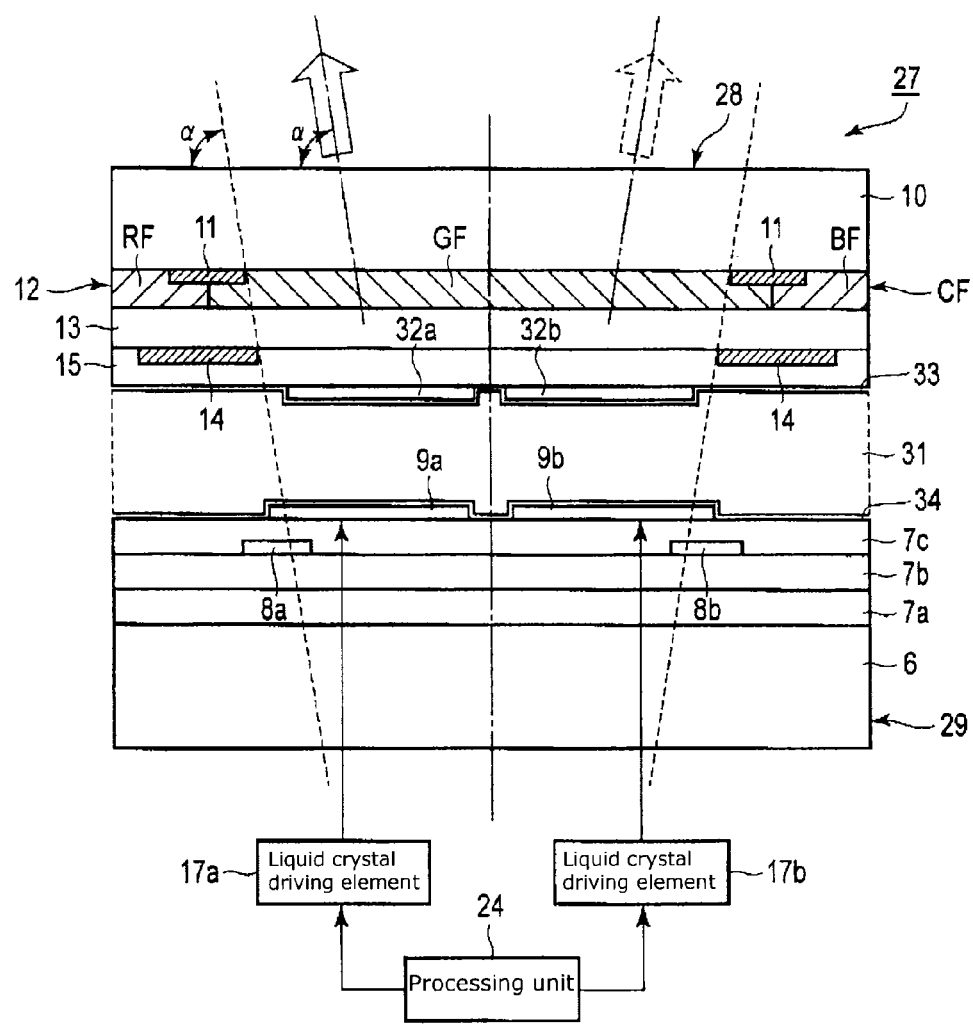
FIG. 15 is a partial sectional view showing an example of an emission state of light by the liquid crystal panel included in the liquid crystal display device according to the third embodiment.

Further, FIG. 15 is a partial sectional view showing an example of an emission state of light by the liquid crystal panel 28 included in the liquid crystal display device 27.

FIG. 14 and FIG. 15 are sectional views viewed from the side of the liquid crystal panel 28.

The light controlling element 19 and the backlight unit 20 are provided at a backside surface of the liquid crystal panel 28. In the present embodiment, for example, respective film thicknesses of the middle transparent resin layer 13 and the transparent resin layer 15 can be adjusted within a range of 0.5 μm to 4 μm. At least one of the middle transparent resin layer 13 and the transparent resin layer 15 may be omitted.

For example, the processing unit 24 controls application timing of voltage by the liquid crystal driving element 17a (first liquid crystal driving element) which corresponds to the pixel electrode 9a (first pixel electrode). The processing unit 24 controls application timing of voltage by the other liquid crystal driving element 17b (second liquid crystal driving element) which corresponds to the other pixel electrode 9b (second pixel electrode). The processing unit 24 controls light emission timing of the solid-state light emitting elements 21a, 21b, 22a and 22b of the backlight unit 20 provided at the backside surface of the liquid crystal panel 28. The processing unit 24 uses image signals for a right eye of the observer and image signals for a left eye. Thereby, 3D images can be displayed. Each of the pixel electrode 9a and the other pixel electrode 9b is electrically connected to a respective liquid crystal driving element 17a, 17b such that voltage-application timing to the pixel electrode 9a and voltage-application timing to the other pixel electrode 9b can be switch-controlled. The observer observes the light at an angle α to the plane of the liquid crystal panel 28.

The emission angle α of the emitted light can be adjusted to the position of the observer and the position of the pointer 23 by regulating the light emission angle θ of the solid-state light emitting elements 21a, 21b, 22a and 22b.

Figure 16:
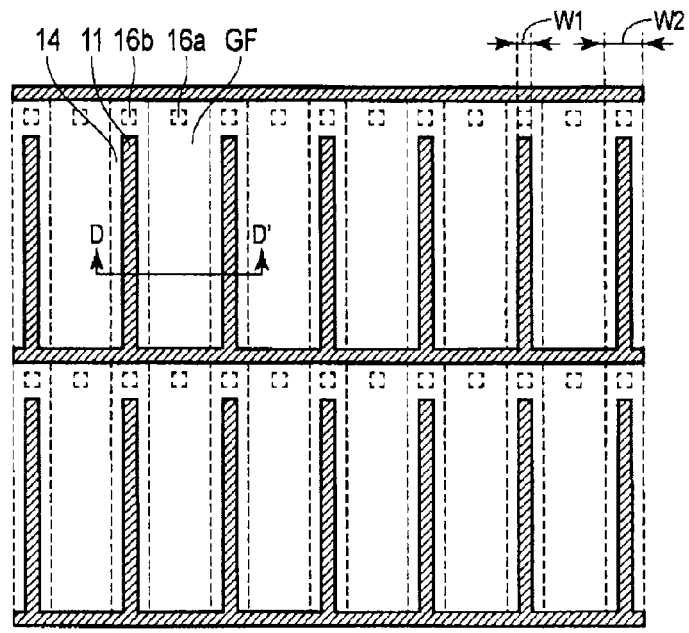
FIG. 16 is a partial plan view showing an example of a plurality of pixels of the liquid crystal panel according to the third embodiment.

FIG. 16 is a partial plan view showing an example of a plurality of pixels of the liquid crystal panel 28. The section taken from D-D' in FIG. 16 corresponds to the foregoing FIG. 15.

For a green pixel, the light sensor 16a is provided below the green filter GF in planar view. The light sensor 16b is provided, for example, in planar view, at a position where the organic pigment light-shielding layer 14 and the green filter GF overlap each other, the organic pigment light-shielding layer 14 containing a plurality of organic pigments. The same applies to the red pixels and the blue pixels.

The processing unit 24 subtracts, from the detection data by the light sensor 16a of the green pixel, the detection data by the light sensor 16b of the green pixel adjacent to the light sensor 16a of the green pixel. The processing unit 24 subtracts, from the detection data by the light sensor 16a of the red pixel, the detection data by the second light sensor 16b of the red pixel adjacent to the first light sensor 16a of the red pixel. Also, the processing unit 24 subtracts, from the detection data by the light sensor 16a of the blue pixel, the detection data by the light sensor 16b of the blue pixel adjacent to the light sensor 16a of the blue pixel. Thereby, the processing unit 24 performs color separation of green, red and blue highly accurately.

The light sensors 16a and 16b with the liquid crystal driving elements 17a and 17b for driving the liquid crystal are included in the array substrate 29.

The carbon pigment light-shielding layer 11 has a linear pattern extending in the pixel longitudinal direction. The width of the linear pattern of the carbon pigment light-shielding layer 11 is defined as W1.

The organic pigment light-shielding layer 14 has a linear pattern extending in the pixel longitudinal direction. The width of the linear pattern of the organic pigment light-shielding layer 14 is defined as W2.

The carbon pigment light-shielding layer 11 and the organic pigment light-shielding layer 14 are parallel overlapped such that the center of the linear pattern of the carbon pigment light-shielding layer 11 and the center of the linear pattern of the organic pigment light-shielding layer 14 match each other, and correspond to two sides of polygonal pixel. The difference between W1 and W2 can be adjusted from 0.5 μm to 10 μm depending on the size of the pixel. If the liquid crystal display device 27, such as a mobile device, is used by one observer, the difference between W1 and W2 may be within a small range from 0.5 μm to 2 μm.

In FIG. 16, the carbon pigment light-shielding layer 11 has a polygonal pixel pattern having a rectangular shape. The line width W1 of the carbon pigment light-shielding layer 11 is narrower than the line width W2 of the organic pigment light-shielding layer 14. In planar view, the axis of the pixel longitudinal direction of the carbon pigment light-shielding layer 11 and the axis of the pixel longitudinal direction of the organic pigment light-shielding layer 14 overlap each other. In other words, the carbon pigment light-shielding layer 11 and the organic pigment light-shielding layer 14 have portions parallel to the long sides of the rectangular pixel.

The difference between W1 and W2, as shown in FIG. 14 and FIG. 15, gives the visible light emitted from the liquid crystal panel 28 the angle α, thereby supporting stereoscopic display effect. The angle α of the emitted light emitted from the liquid crystal pane 28 can be optionally adjusted by the emission angle of the light emitted from the solid-state light emitting elements 21a, 21b, 22a and 22b, the angle of the apex angle of the triangular prism, or the like. Accordingly, regarding the relation of line widths of W1 and W2, any one of the line widths may be larger or smaller.

As shown in FIG. 6, the transmittance characteristics BLK1 which is an example of the organic pigment light-shielding layer 14 is low at a wavelength of the visible region, is low at a wavelength longer than light wavelength 700 nm, but becomes high at a wavelength longer than light wavelength 800 nm.

As another example of the organic pigment light-shielding layer 14, the transmittance characteristics BLK2 is low at a short wavelength of light wavelength 670 nm or shorter, increases at a wavelength longer than about light wavelength 670 nm, and becomes high at a wavelength longer than about light wavelength 700 nm.

The carbon pigment light-shielding layer 11 which is not shown in the drawings can be obtained from a resin dispersion coating film containing carbon as the main material of color materials having a to light-shielding properties. The carbon pigment light-shielding layer 11 has high light-shielding properties in the visible region and infrared region.

The organic pigment light-shielding layer 14 having high transmittance characteristics at a wavelength longer than about light wavelength 670 nm can be obtained, for example, by dispersing a plurality of organic pigments in a resin coating film. In the present invention, the half-value wavelength means a light wavelength at which the transmittance is about 50% in the transmittance characteristics of the organic pigment light-shielding layer 14 where the transmittance becomes high in a wavelength region including light wavelength 800 nm and longer than light wavelength 670 nm. For example, in the transmittance characteristics BLK1, as shown in FIG. 6, the half-value wavelength is about 800 nm.

The carbon pigment light-shielding layer 11 and the organic pigment light-shielding layer 14 each may further contain a slight amount of organic pigment or carbon pigment in order to adjust reflection color or increase light-shielding properties.

Regarding the transmittance characteristics BLK2 of the organic pigment light-shielding layer 14, by increasing the transmittance at a wavelength longer than about light wavelength 670 nm, the carbon pigment light-shielding layer 11 and alignment marks used as a pattern for an under layer can be recognized. The pattern for the under layer including the carbon pigment light-shielding layer 11 and the alignment marks can be detected using infrared light, since it is almost impossible for infrared light to pass through it.

The backlight unit 20 is provided on the backside surface (surface of the array substrate 29 opposite to the liquid crystal layer 31) through the polarization plate 18b. In the present embodiment, the backlight unit 20 has, as basic constituents, the solid-state light emitting elements 21a, 21b, 22a and 22b such as an LED (light-emitting diode), a light controlling element 19 including an array of semicircular column lenses 19a and an array of triangular prisms 19b, and a reflector 35.

Figure 17:
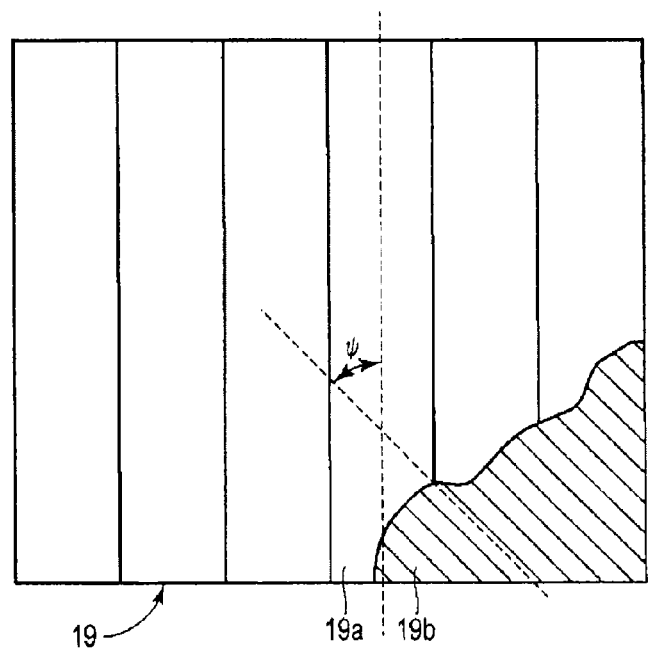
FIG. 17 is a plan view showing an example of a configuration of a light controlling element according to the third embodiment.

FIG. 17 is a plan view showing an example of a configuration of the light controlling element 19 according to the present embodiment. A part of FIG. 7 shows a section of the light controlling element 19.

The longitudinal axes of the plurality of semicircular column lenses 19a are parallel. The axes of the semicircular column lenses 19a are perpendicular to the shorter side direction of the pixel, and parallel to the longitudinal direction of the pixel.

The longitudinal axes of a plurality of triangular prisms 19b are parallel. The axes of the plurality of triangular prisms 19b have an angle ψ with respect to the axes of the semicircular column lenses 19a in planar view. The angle ψ may range, for example, 3° to 42°. The angle ψ may be larger than this range. The angle ψ is set not to interfere with the polarization plates 18a, 18b or the optical axis of the liquid crystal alignment.

The array of the semicircular column lenses 19a and the array of the triangular prisms 19b may be integrally formed back to back. The pitch between the triangular prisms 19b may be 1:1 relation to the pitch between the semicircular column lenses 19a, or the pitch between the triangular prisms 19b may be smaller than the pitch between the semicircular column lenses 19a.

In the liquid crystal panel 28 according to the present embodiment as described above, the common electrodes 8a and 8b protrude further toward the ends of the pixel than the pixel electrodes 9a and 9b do. For example, the common electrodes 8a and 8b may be set to be a common electric potential. Each of two pixel electrodes 9a and 9b provided for every pixel is electrically connected to a respective liquid crystal driving element 17a, 17b. Image signals for right eyes and image signals for left eyes of observers are supplied to the different liquid crystal driving elements 17a and 17b respectively, thereby stereoscopic display can be performed. Each of image signals for right eye and image signals for left eyes may be separated into projecting image signals and background image signals enhancing the appearance of depth.

The foregoing configuration and control according to the present embodiment described above enables high speed operation suitable for stereoscopic display. The liquid crystal molecules L1 to L8 are driven by the liquid crystal driving elements 17a and 17b in synchronization with the emission timing of the solid-state light emitting elements 21a, 21b, 22a and 22b, such as LED, included in the backlight unit 20, which can enhance display effect of 3D images.

The liquid crystal display device according to the foregoing embodiments may be used for direct-copying.

Figure 18:
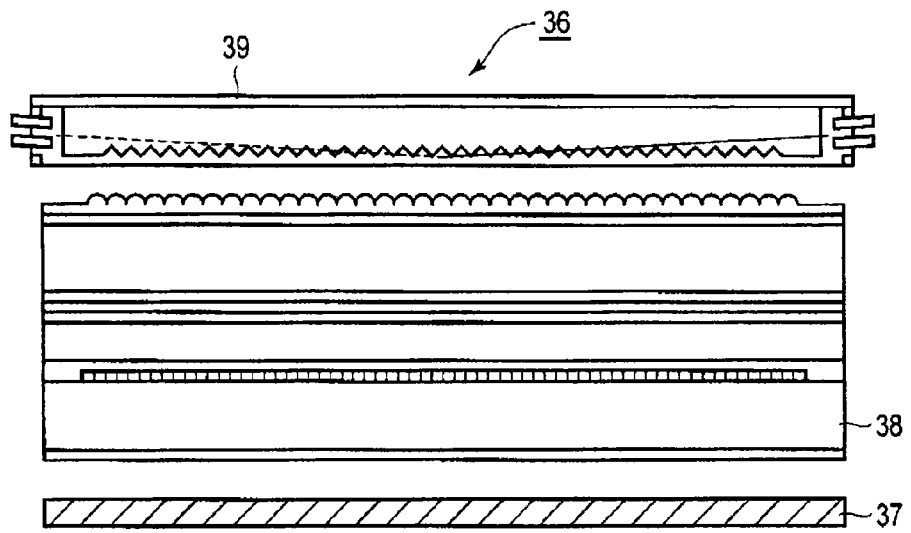
FIG. 18 is a sectional view showing an example of a liquid crystal display device used for direct-copying.

FIG. 18 is a sectional view showing an example of the liquid crystal display device 36 used for the direct-copying.

In the direct-copying, a print piece 37, a picture or the like faces the color filter substrate 38. In FIG. 18, the color filter substrate 38 is disposed on the lower side, and the backlight unit 39 is disposed on the upper side. The liquid crystal display device 36 displays white, emits light toward the print piece, and copies directly.

Fourth Embodiment

In the present embodiment, an example of methods for producing the color filter substrate according to the above described respective embodiments is described.

Figure 19:
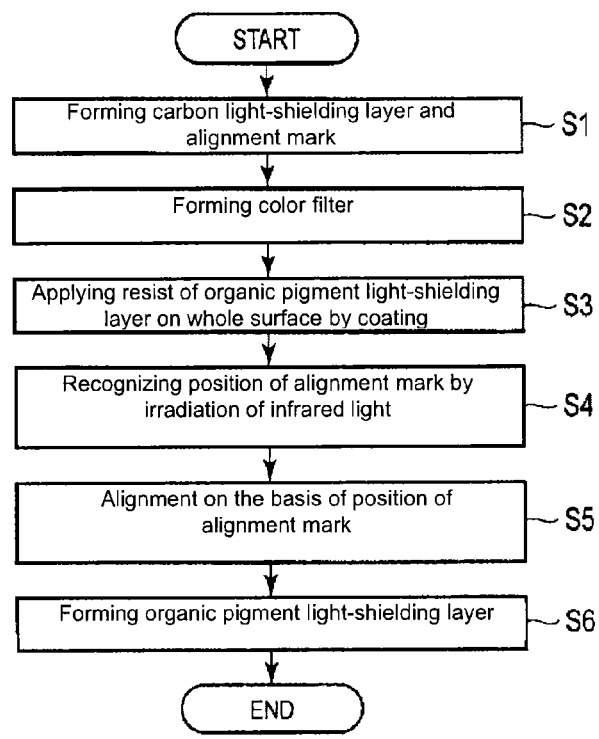
FIG. 19 is a flow chart showing an example of a method for producing a color filter substrate according to a fourth embodiment of the present invention.

FIG. 19 shows a flow chart showing an example of a method for producing the color filter substrate according to the present embodiment.

In step S1, the transparent substrate 10 is coated with a light-shielding color material whose main material is carbon, exposed to light and developed, thereby forming the carbon pigment light-shielding layer 11 and the alignment marks. In this step S1, as manufacturing machines, a coater, a dryer, an exposure machine, a development apparatus, a film curing machine and the like can be used. As a typical dryer and film curing machine, for example a clean oven and a hot plate can be used. The light-shielding color material whose main material is carbon is described below in a sixth embodiment as a black resist 1 which is a light-sensitive colored composition of the carbon pigment light-shielding layer.

In step S2, a color filter material is applied by coating, followed by exposing to light and developing, thereby forming a color filter CF. In step S2, a coater, a dryer, an exposure machine, a development apparatus, a film curing machine and the like can be used. The process of step S2 includes a unicolor coloring process for each of a red filter RF, blue filter BF and green filter GF. The color filter material is specifically described in the sixth embodiment as red resist, blue resist and green resist light-sensitive colored compositions.

In step S3, a light-shielding resist containing a light-shielding color material whose main material is an organic pigment is applied on the whole surface of the substrate by coating using a coater. The light-shielding color material is described in the sixth embodiment as a light-sensitive colored composition of the organic pigment light-shielding layer.

In step S4, infrared light is irradiated in the exposure machine, and the position of the alignment marks preliminarily formed with the carbon pigment light-shielding layer 11 is recognized. The alignment marks are recognized through the coating film of the light-shielding resist by an infrared light sensor (infrared camera). The exposure machine preliminarily has photomasks where an organic pigment light-shielding layer pattern and a pattern of the organic pigment light-shielding layer alignment mark are formed.

In step S5, the alignment marks of the photomask are aligned with the alignment marks formed with the carbon pigment light-shielding layer 11 by using alignment function of the exposure machine.

In step S6, the light-shielding resist containing the light-shielding color material whose main material is an organic pigment is exposed to light, developed and cured, thereby forming the pattern as the organic pigment light-shielding layer 14.

In the present embodiment, by using the alignment marks containing carbon as the main material of the light-shielding color material, alignment can be performed after forming the color filter CF.

Hereinafter is described in detail the method for producing the color filter substrate of FIG. 16.

At first, the whole surface of the transparent substrate 10 such as a glass substrate is coated with the black resist 1 for forming the carbon pigment light-shielding layer 11 such that the coating film after drying has a film thickness 1.5 μm.

Next, the substrate is pre-baked in a clean oven at 70° C. for 20 minutes, and cooled to the room temperature. The substrate is exposed to ultraviolet light through a photomask using an extra high pressure mercury lamp of the exposure machine. At this time, cross-shaped alignment marks made of the carbon pigment light-shielding layer 11 is formed on a part of the outermost periphery of the substrate. Thereafter, the substrate is spray-developed using sodium carbonate aqueous solution supplied at 23° C., cleaned with ion-exchange water, and air-dried. Further, the substrate is post-baked in a clean oven at 230° C. for 30 minutes, thereby forming the carbon pigment light-shielding layer 11.

The pattern of the carbon pigment light-shielding layer 11 is, for example, a matrix pattern of oblong figures having openings as shown in FIG. 16. In FIG. 16, a part of the sides of the pattern of the carbon pigment light-shielding layer 11 is cut out at the position overlapping the light sensors 16b.

Next, the red resist is coated on the substrate to have a film thickness of 2.5 μm and dried. A striped color layer is exposed to light with an exposure machine, and developed, thereby forming the pattern of the red filter RF.

Subsequently, the green resist is coated on the substrate to have a film thickness of 2.5 μm and dried. A striped color layer is exposed to light with an exposure machine, and developed, thereby forming the pattern of the green filter GF.

Next, the blue resist is coated on the substrate to have a film thickness of 2.5 μm and dried. A striped color layer is exposed to light with an exposure machine, and developed, thereby forming the pattern of the blue filter BF.

The above processes for developing or curing the red filter RF, the green filter GF and the blue filter BF are the same as that of the carbon pigment light-shielding layer.

After forming the patterns of the red filter RF, the green filter GF and the blue filter BF, the transparent resin middle layer 13 is formed by coating to have a film thickness of 2 μm.

Next, after curing the transparent resin middle layer 13, using a coater, the black resist 2 containing an organic pigment as the main light-shielding material is coated on the whole surface of the substrate such that a film thickness after drying is 1.5 μm.

For example, the substrate is pre-baked at 70° C. for 20 minutes using a hot plate, the substrate is cooled to a room temperature, and is set in an exposure machine having an extra high pressure mercury lamp.

At this time, infrared light of light wavelength 850 nm is applied from the rear side of the substrate, the infrared light emitted from the top surface (coating surface of the black resist 2) is detected by an infrared light sensor (infrared camera), thereby recognizing the position of the alignment marks. As shown in FIG. 6, the carbon light-shielding film 11 and the alignment marks are not permeable to infrared light, and the black resist 2 where the main material of the light-shielding color materials is an organic pigment is permeable to infrared light. Using infrared light enables recognition of the alignment marks, thereby accurate alignment can be performed. Regarding the wavelength of the infrared light used for the recognition of the alignment marks, infrared light of light wavelength 700 nm or light wavelength 800 nm or longer is preferred. When a CCD or CMOS is used as the infrared light sensor, infrared light based on sensitive region of semiconductor included in the infrared light sensor is employed.

After the alignment, the substrate is exposed to ultraviolet light through a photomask, using the extra high pressure mercury lamp of the exposure machine. Thereafter, the substrate is spray-developed with an aqueous solution of sodium carbonate of 23° C. using a development apparatus or the like, is cleaned with ion-exchanged water, and is dried in air. The substrate is post-baked in a clean oven at 230° C. for 30 minutes, and is subjected to curing, thereby forming the organic pigment light-shielding layer 14.

Further, the transparent resin layer 15 is coated on the organic pigment light-shielding layer 14 and cured. As a result, the color filter substrates 4, 26 are produced.

In the present embodiment, the color filter substrates 4, 26 may further include counter electrodes 32a and 32b of transparent electrically-conductive films such as ITO. However, in the liquid crystal display device according to the liquid crystal driving method such as IPS, the transparent electrically-conductive films 32a and 32b can be omitted.

Fifth Embodiment

In the present embodiment, a modification of the above embodiments is described. In this embodiment, although the modification according to the first embodiment is described, the same is applied to the other embodiments.

Figure 20:
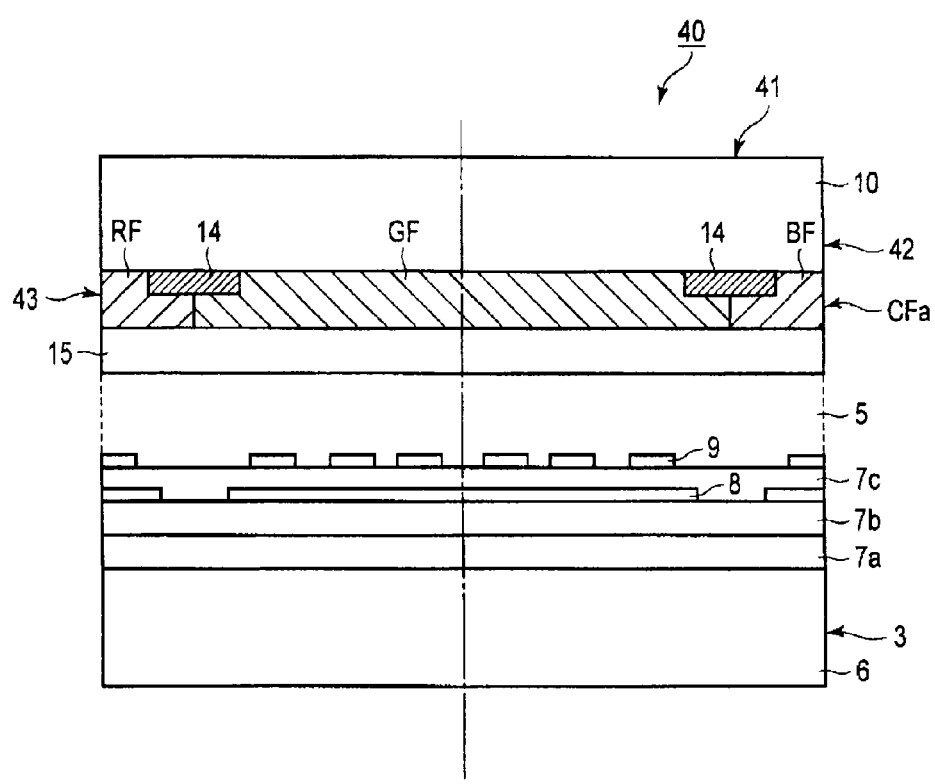
FIG. 20 is a partial sectional view showing an example of a configuration of a liquid crystal panel included in a liquid crystal display device according to a fifth embodiment of the present invention.

FIG. 20 is a partial sectional view showing an example of a configuration of a liquid crystal panel 41 included in the liquid crystal display device 40 according to this embodiment.

The liquid crystal panel 41 includes the array substrate 3, a color filter substrate 42 and the liquid crystal layer 5. The array substrate 3 and the color filter substrate 42 face each other. The liquid crystal layer 5 is sandwiched between the array substrate 3 and the color filter substrate 42.

The color filter substrate 42 includes the transparent substrate 10, a color filter layer 43 having the organic pigment light-shielding layer 14 and a color filter CFa, and the transparent resin layer 15.

In the formation of the color filter layer CFa, on the organic pigment light-shielding layer 14, patterns of the red filter RF, the green filter GF and the blue filter BF are formed into polygonal pixel shapes.

Figure 21:
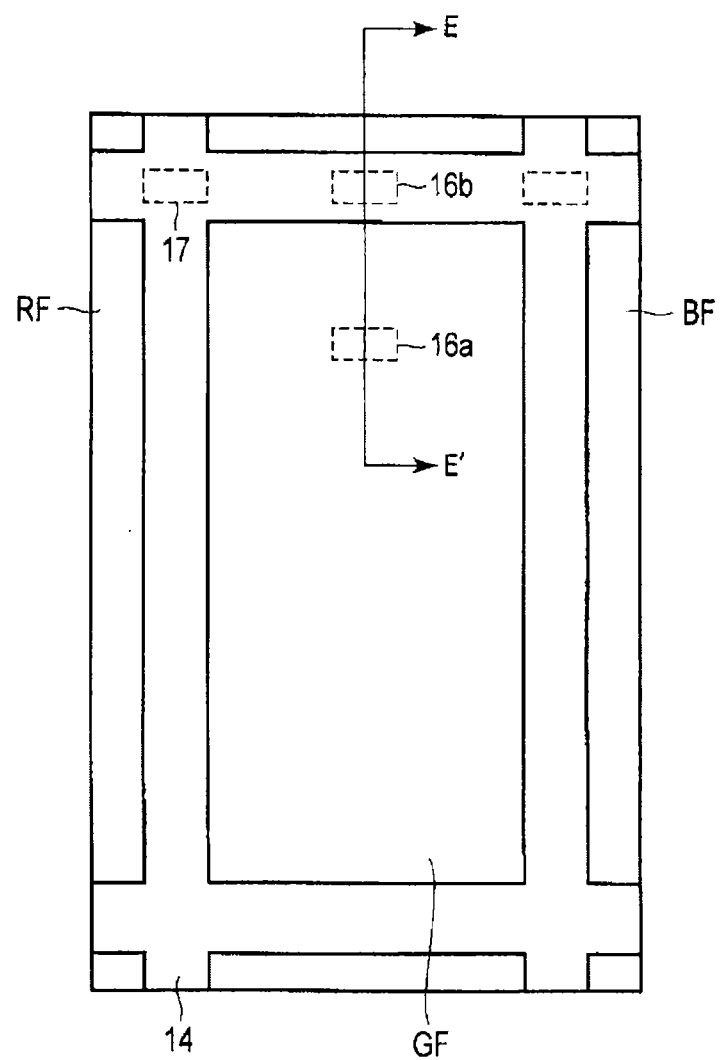
FIG. 21 is a partial plan view showing an example of a structure of a liquid crystal panel according to the fifth embodiment, the structure being viewed from over a color filter substrate.

FIG. 21 is a partial plan view showing an example of the structure of the liquid crystal panel 41 according to the present embodiment, the structure being viewed from over the color filter substrate 42. The section of FIG. 21 taken from E-E' is the same as FIG. 3.

In the method for producing the color filter substrate 42 according to the present embodiment, processes from a first step to a third step are performed in this order.

In the first step, the organic pigment light-shielding layer 14 is formed on the transparent substrate 10. The organic pigment light-shielding layer contains an organic pigment as the main material of the light-shielding color materials, and has a matrix of openings in planar view.

In the second step, the color filter CFa is formed. In the color filters, the red filter RF, the blue filter BF and the green filter GF are assigned to the respective plurality of openings.

In the third step, the transparent resin layer 15 is formed on the color filter CFa.

The organic pigment light-shielding layer 14 is constituted by a resin composition containing 50 to 75% of a violet organic pigment, 25 to 50% of a yellow organic pigment, or 0 to 30% of a red organic pigment, in mass percentage (%) relative to the sum of the organic pigments. The organic pigment light-shielding layer 14 has portions which optically overlap each unicolor layer of the red filter RF, the blue filter BF and the green filter GF. The carbon pigment light-shielding layer which is not shown in the drawing is formed to be as a pattern on the frame surrounding the four sides of the display surface, and as the alignment marks, before the organic pigment light-shielding layer 14 is formed.

In the liquid crystal display device 40 according to the present embodiment, the calculation described in the above first embodiment can be performed, and color-separation can be carried out highly accurately.

Sixth Embodiment

In the present embodiment, materials such as of transparent resins and organic pigments used in the color filter substrates 4, 26 and 30 according to the foregoing first to fifth embodiments are exemplified.

<Transparent Resin>

The light-sensitive colored composition used for forming the carbon pigment light-shielding layer 11, the organic pigment light-shielding layer 14 and the color filter CF contains, in addition to a pigment dispersion (hereinafter referred to paste), a multifunctional monomer, a light-sensitive resin or non-light-sensitive resin, a polymerization initiator, a solvent and the like. For example, organic resins having high transparency, such as the light-sensitive resin or the non-light-sensitive used in this embodiment, are collectively referred to as transparent resins.

As the transparent resins, thermoplastic resins, thermosetting resins or light-sensitive resins can be used. As the thermoplastic resins, for example, butyral resin, styrene-maleic acid copolymer, chlorinated polyethylene, chlorinated polypropylene, polyvinyl chloride, vinyl chloride-vinyl acetate copolymer, polyvinyl acetate, polyurethane-based resin, polyester resin, acrylic-based resin, alkyd resin, polystyrene resin, polyamide resin, rubber-based resin, cyclized rubber-based resin, celluloses, polybutadiene, polyethylene, polypropylene, polyimide resin, or the like can be used. As the thermosetting resins, for example, epoxy resin, benzoguanamine resin, rosin-modified maleic acid resin, rosin-modified fumaric acid resin, melamine resin, urea resin, phenol resin, or the like can be used. The thermosetting resin may be generated by reacting melamine resin with a compound containing an isocyanate group.

<Alkali Soluble Resin>

For forming the light-shielding film such as the carbon pigment light-shielding layer 11 and the organic light-shielding layer 14, the transparent resin layers 13, 15 and the color filters CF according to the present embodiment, it is preferred to use a light-sensitive resin composition which can be patterned by photo lithography. These transparent resins are preferred to be resins having alkali solubility. As the alkali soluble resins, a resin containing a carboxyl group or a hydroxyl group may be used, or other resins may be used. As the alkali soluble resins, epoxy acrylate-based resin, novolac-based resin, polyvinyl phenol-based resin, acrylic-based resin, epoxy resin containing a carboxyl group, urethane resin containing a carboxyl group or the like can be used. Of these resins, as the alkali soluble resin, it is preferred to use epoxy acrylate-based resin, novolac-based resin or acrylic-based resin, and especially epoxy acrylate-based resin or novolac-based resin is preferred.

<Acrylic Resin>

As the representatives for the transparent resin according to the present embodiment, the following acrylic-based resin can be exemplified.

As acrylic-based resins, there can be used polymers obtained by using, as a monomers, for example, (meth) acrylic acid; alkyl(meth)acrylate such as methyl(meth)acrylate, ethyl(meth)acrylate, propyl(meth)acrylate, butyl(meth)acrylate, t-butyl(meth)acrylate pendyl(meth)acrylate or lauryl(meth)acrylate; (meth)acrylate containing a hydroxyl group such as hydroxyethyl(meth)acrylate, or hydroxypropyl(meth)acrylate; (meth)acrylate containing an ether group such as ethoxyethyl(meth)acrylate, or glycidyl(meth)acrylate; alicyclic (meth)acrylate such as cyclohexyl(meth)acrylate, isobornyl(meth)acrylate or dicyclopentenyl(meth)acrylate; or the like.

It should be noted that these monomers mentioned as examples can be used singularly, or can be used in combination of two or more types.

Further, acrylic resin can be produced by using copolymer containing a compound which can copolymerize with these monomers, such as styrene, cyclohexylmaleimide or phenylmaleimide. For example, the copolymer obtained by copolymerizing a carboxylic acid having an ethylenic unsaturated group, such as (meth)acrylic acid, are reacted with the compound containing an epoxy group and an unsaturated double bond, such as glycidyl methacrylate. Thereby, a resin having light-sensitivity may be generated to obtain acrylic resin. For example, a compound containing a carboxylic acid, such as (meth)acrylic acid, may be added to a polymer of (meth)acrylate containing an epoxy group, such as glycidyl methacrylate, or a copolymer of this polymer and another (meth) acrylate, thereby generating the resin having light-sensitivity as the acrylic resin.

<Organic Pigment>

As the red pigments, there can be used, for example, C.I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, 279 or the like.

As the yellow pigments, there can be used, for example, C.I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214 or the like.

As the blue pigments, there can be used, for example, C.I. Pigment Blue 15, 15:1, 15:2, 15:3, 15:4, 15:6, 16, 22, 60, 64, 80 or the like. Of these pigments, C.I. Pigment Blue 15:6 is preferred.

As the violet pigments, there can be used, for example, C.I. Pigment Violet 1, 19, 23, 27, 29, 30, 32, 37, 40, 42, 50 or the like. Of these pigments, C.I. Pigment Violet 23 is preferred.

As the green pigments, there can be used, for example, C.I. Pigment Green 1, 2, 4, 7, 8, 10, 13, 14, 15, 17, 18, 19, 26, 36, 45, 48, 50, 51, 54, 55, 58 or the like. Of these pigments, C.I. Pigment Green 58 which is a halogenated zinc phthalocyanine green pigment is preferred. As the green pigment, a halogenated aluminum phthalocyanine green pigment may also be used.

<Color Materials of Carbon Pigment Light-Shielding Layer 11 and Organic Pigment Light-Shielding Layer 14>

The color materials contained in the carbon pigment light-shielding layer 11 and the organic pigment light-shielding layer 14 are color materials which absorb light in at least the visible light wavelength region, and which have light-shielding properties. In the present embodiment, for the light-shielding color materials, for example, an organic pigment, an inorganic pigment, a dye or the like can be used. As the inorganic pigments, for example, carbon black, titanium oxide or the like can be used. As the dyes, there can be used, for example, azo-based dyes, anthraquinone-based dyes, phthalocyanine-based dyes, quinonimine-based dyes, quinoline-based dyes, nitro-based dyes, carbonyl dyes, methine-based dyes or the like. As the organic pigments, for example, the foregoing organic pigments can be employed. Regarding the light-shielding color materials, one type of color material may be used, or two or more types of color materials may be combined in a proper ratio.

For example, the visible light wavelength range is within a range of about light wavelength 400 nm to 700 nm.

The wavelength (half-value wavelength) at which the transmittance of the organic pigment light-shielding layer 14 related to the present embodiment rises is within a range from about light wavelength 670 nm to about light wavelength 800 nm. The transmittance of the red filter RF is kept high at light wavelength approximately 670 nm and the transmittance of the blue filter BF rises to become high at light wavelength approximately 800 nm.

<Example of Black Resist 1 Employed in Carbon Pigment Light-Shielding Layer 11>

An example of preparation of a black paste (dispersion) used in the carbon pigment light-shielding layer 11 is described.

A mixture having the following formulation is stirred and mixed uniformly, agitated with a bead mill disperser, thereby preparing a black paste. Each composition is represented by mass part.

| | |
|---|---|
| Carbon pigment | 20 parts |
| Dispersant | 8.3 parts |
| Copper phthalocyanine derivatives | 1.0 part |
| Propylene glycol monomethyl ether acetate | 71 parts |

A mixture having the following formulation is stirred and mixed to become uniform using the foregoing black paste and then, filtered with an approximately 5 μm filter to prepare a black resist 1 applied to the carbon pigment light-shielding layer 11. In the present embodiment, the resist means a light-sensitive colored composition containing carbon or a pigment.

| | |
|---|---|
| Black paste | 25.2 parts |
| Acrylic resin solution | 18 parts |
| Dipentaerythritol penta and hexa-acrylate | 5.2 parts |
| Photopolymerization initiator | 1.2 parts |
| Sensitizer | 0.3 parts |
| Leveling agent | 0.1 parts |

| | |
|---|---|
| Cyclohexanone | 25 parts |
| Propylene glycol monomethyl ether acetate | 25 parts |

In the present embodiment and the above described embodiments, a main color material (pigment) in the black resist 1 or a color resist means a color material accounting for 50% or more of the total mass percentage (%) of the color materials (pigments) contained in the resist. For example, in the black resist 1, carbon accounts for 100% of the color materials, accordingly the main color material is carbon. In a black resist where carbon is the main color material, in order to adjust its color tone or reflection color, 10% or less, in mass percentage to the total mass, of an organic pigment such as red, yellow or blue may be added to the black resist.

<Example of Black Resist 2 Used in Organic Pigment Light-Shielding Layer 14>

A mixture example of organic pigments used in the organic pigment light-shielding layer 14 is as shown below.

C.I. Pigment Red 254 (hereinafter abbreviated to R254)
C.I. Pigment Yellow 139 (hereinafter abbreviated to Y139)
C.I. Pigment Violet 23 (hereinafter abbreviated to V23)

Of these three types of pigments, R254 may be omitted. Further, aside from these three types of pigments, in order to adjust color (transparency wavelength), a small amount (20% or less) of another pigment, for example the foregoing organic pigment, may be added. For example, a small amount of green pigment of a halogenated zinc phthalocyanine or a halogenated aluminum phthalocyanine may be used for adjusting rise of spectral characteristics at the vicinity of light wavelength 700 nm (adjustment of the shape of spectral curve).

The organic pigment light-shielding layer 14 is preferred to have a transmittance of 5% or less in the visible region. The visible region is generally about light wavelength 400 nm to 700 nm. Setting the half-value wavelength of the organic pigment light-shielding layer 14 to be within a range from light wavelength 670 nm to 750 nm requires the infrared light transmittance characteristics to rise from the vicinity of about light wavelength 660 nm and the transmittance characteristics become high in the longer wavelength side. The wavelength range where the organic pigment light-shielding layer 14 has a low transmittance may be set to be a range of about light wavelength 400 nm to 650 nm. By increasing the amount of the pigments contained in the organic pigment light-shielding layer 14 or increasing a film thickness of the organic pigment light-shielding layer 14, the transmittance of the organic pigment light-shielding layer 14 in a range of light wavelength 400 nm to 650 nm can be set at a low value of 5% or less extremely readily. The wavelength position of the half-value wavelength can also be adjusted readily on the basis of the amount of pigments, the formulation ratio of a violet pigment, green pigment, yellow pigment and red pigment described later, the film thickness of the organic pigment light-shielding layer 14, or the like. As the green pigments used in the organic pigment light-shielding layer 14, various green pigments described later can be employed. For setting the half-value wavelength of the organic pigment light-shielding layer 14 to be within a range from light wavelength 670 nm to 750 nm, as the green pigment, a green pigments whose rise (for example, half-value wavelength) of infrared light transmittance is within a range of light wavelength 700 nm to 800 nm is preferred.

The adjustment for setting the half-value wavelength to be within a range of light wavelength 670 nm to 750 nm is realized on the basis of mainly the violet pigment and the green pigment. In order to adjust the spectroscopic characteristics of the organic pigment light-shielding layer 14, blue pigments may be added. Examples of the pigments for adjusting the half-value wavelength of the organic pigment light-shielding layer 14 can include, for example, C.I. Pigment Blue 15:3, C.I. Pigment Green 36 or the like, whose half-value wavelength is within a range of 700 nm to 780 nm as a single pigment dispersion.

The mass percentage (%) of R254 may range, for example, from 0 to 15%.

The mass percentage (%) of Y139 may range, for example, from 25 to 50%.

The mass percentage (%) of V23 may range, for example, from 50 to 75%.

If the organic pigment light-shielding layer 14 has a standard film thickness, for example, a film thickness of approximately 2 μm, violet pigment of V23 of which content is within 50 to 75% is added. As a result, the organic pigment light-shielding layer 14 has the half-value wavelength within light wavelength 670 nm to 750 nm. Yellow organic pigment content is within 25 to 50%, and 0 to 15% of a red organic pigment is added and mixed. This can lower the transmittance of the organic pigment light-shielding layer 14 in light wavelength 400 nm to 660 nm sufficiently. The offset (deviation of spectrum from the base line of 0%) of the transmittance of the organic pigment light-shielding layer 14 in a range of light wavelength 400 nm to 660 nm is removed. This enables accurate color-separation by subtracting the detection data of the light sensor 16b from the detection data of the light sensor 16a.

Ordinarily, before a color resist (colored composition) is prepared based on these pigments, a pigment is dispersed in a resin or a solution to prepare a pigment paste (dispersion). For example, in order to disperse the simple pigment Y139 in the resin or solution, the following materials are mixed with 7 parts (mass part) of the pigment R139.

| | |
|---|---|
| Acrylic resin solution (Solid content 20%) | 40 parts |
| Dispersant | 0.5 parts |
| Cyclohexanone | 23.0 parts |

Other pigments such as V23 or R254 may also be dispersed in the same resin or solution, and a black pigment dispersion paste may be prepared.

Formulation ratios for preparing a black resist on the basis of the above pigment dispersion paste are shown as an example, below.

| | |
|---|---|
| Y139 paste | 14.70 parts |
| V23 paste | 20.60 parts |
| Acrylic resin solution | 14.00 parts |
| Acrylic monomer | 4.15 parts |
| Initiator | 0.7 parts |
| Sensitizer | 0.4 parts |
| Cyclohexanone | 27.00 parts |
| PGMAC | 10.89 parts |

According to the above formulation ratio, a black resist 2 to be used in the organic pigment light-shielding layer 14 is formed.

The black resist 2 which is the main color material in the pigment used for the formation of the organic pigment light-shielding layer 14 is the violet pigment V23 accounting for approximately 58% of the total mass percentage. Many of organic pigments have high transmittance at a wavelength range longer than about light wavelength 800 nm. The yellow pigment Y139 is also an organic pigment having high transmittance at a wavelength range longer than about light wavelength 800 nm.

For example, the main color material of a black resist contained in the organic pigment light-shielding layer 14 may be 100% of an organic pigment. For example, in order to adjust light-shielding properties, 40% or less, which is a rough target amount in the total mass, of carbon may be added to the black resist where an organic pigment is the main color material.

<Example of Red Resist Used in Color Filter Substrates 4, 26 and 30>

A preparation example of the red paste (dispersion) is described, below.

The mixture having the following formulation is uniformly stirred and mixed, dispersed with a sand mill using glass beads having a diameter of about 1 mm for 5 hours, and filtered with an approximately 5 μm filter, thereby preparing a red paste.

| | |
|---|---|
| Red pigment C.I. Pigment Red 254 | 8 parts |
| Red pigment C.I. Pigment Red 177 | 10 parts |
| Yellow pigment C.I. Pigment Yellow 150 | 2 parts |
| Dispersant | 2 parts |
| Acrylic varnish (Solid content 20 mass %) | 108 parts |

<Preparation of Red Resist>

After preparing the red paste, the mixture having the following formulation is stirred and mixed to be uniform, and filtered with an approximately 5 μm filter, thereby preparing a red resist.

| | |
|---|---|
| Red paste | 42 parts |
| Acrylic resin solution | 18 parts |
| Dipentaerythritol penta and hexa-acrylate | 4.5 parts |
| Photopolymerization initiator | 1.2 parts |
| Sensitizer | 2.0 parts |
| Cyclohexanone | 32.3 parts |

<Example of Green Resist Used in Color Filter Substrates 4, 26 and 30

<Preparation of Green Paste>

The mixture having the following formulation is uniformly stirred and mixed, dispersed with a sand mill using glass beads having a diameter of about 1 mm for 5 hours, and filtered with an approximately 5 μm filter, thereby preparing a green paste (dispersion).

| | |
|---|---|
| Green pigment C.I. Pigment Green 58 | 10.4 parts |
| Yellow pigment C.I. Pigment Yellow 150 | 9.6 parts |
| Dispersant | 2 parts |
| Acrylic varnish (Solid content 20 mass %) | 66 parts |

<Preparation of Green Resist>

After preparing the green paste, the mixture having the following formulation is stirred and mixed to be uniform, and filtered with an approximately 5 μm filter, thereby preparing a green resist.

| | |
|---|---|
| Green paste | 46 parts |
| Acrylic resin solution | 8 parts |
| Dipentaerythritol penta and hexa-acrylate | 4 parts |
| Photopolymerization initiator | 1.2 parts |
| Photopolymerization initiator | 3.5 parts |
| Sensitizer | 1.5 parts |
| Cyclohexanone | 5.8 parts |
| Propylene glycol monomethyl ether acetate | 30 parts |

<Example of Blue Resist Used in Color Filter Substrates 4, 26 and 30>

<Preparation of Blue Paste 1>

The mixture having the following formulation is uniformly stirred and mixed, dispersed with a sand mill using glass beads having a diameter of about 1 mm for 5 hours, and filtered with an approximately 5 μm filter, thereby preparing a blue paste 1.

| | |
|---|---|
| Blue pigment C.I. Pigment Blue 15:6 | 52 parts |
| Dispersant | 6 parts |
| Acrylic varnish (Solid content 20 mass %) | 200 parts |

<Preparation of Blue Paste 2>

The mixture having the following formulation is uniformly stirred and mixed, dispersed with a sand mill using glass beads having a diameter of approximately 1 mm for 5 hours, filtered with an approximately 5 μm filter, dispersed for 5 hours with a mill, and filtered with an approximately 5 μm filter, thereby preparing an intermediate blue paste.

| | |
|---|---|
| Blue pigment C.I. Pigment Blue 15:6 | 49.4 parts |
| Dispersant | 6 parts |
| Acrylic varnish (Solid content 20 mass %) | 200 parts |

The following violet dye powders are added to this intermediate blue paste, followed by stirring sufficiently, thereby preparing a blue paste 2.

| | |
|---|---|
| Violet dye | 2.6 parts |

<Preparation of Blue Resist>

After preparing the blue paste 1, the mixture having the following formulation is stirred and mixed to be uniform, and filtered with an approximately 5 μm filter, thereby preparing a blue resist.

| | |
|---|---|
| Blue paste | 16.5 parts |
| Acrylic resin solution | 25.3 parts |
| Dipentaerythritol penta and hexa-acrylate | 1.8 parts |
| Photopolymerization initiator | 1.2 parts |
| Sensitizer | 0.2 parts |
| Cyclohexanone | 25 parts |
| Propylene glycol monomethyl ether acetate | 30 parts |

<Preparation of Color Filter Substrates 4, 26 and 30>

The color filter substrates 4, 26 and 30 are prepared by combining the red resist, the green resist and the blue resist of the above three colors according to, for example, the producing method described in the above fourth embodiment.

Various modifications of the above-described embodiments can be made and applied without departing from the scope of the invention. The above embodiments can be combined optionally and employed.

The present invention has been made, and has its object to provide a liquid crystal display device which can highly accurately perform color separation and touch-sensing, a color filter substrate and a method for producing a color filter substrate.

A liquid crystal display device of a first aspect of the present invention includes an array substrate including a liquid crystal driving element, a first light sensor and a second light sensor, a liquid crystal layer, and a color filter substrate facing the array substrate through the liquid crystal layer and including a carbon light-shielding layer, color filters and an organic pigment light-shielding layer, the carbon light-shielding layer containing carbon as a main material of light-shielding color materials, the organic pigment light-shielding layer containing an organic pigment as a main material of light-shielding color materials, the organic pigment light-shielding layer overlapping a part of the color filters in a direction perpendicular to a substrate plane. The first light sensor detects light in the direction perpendicular to the substrate plane, the light passing through any of the color filters without passing through the organic pigment light-shielding layer. The second light sensor detects light in the direction perpendicular to the substrate plane, the light passing through any of the color filters and the organic pigment light-shielding layer.

In the liquid crystal display device of the first aspect of the present invention, the organic pigment light-shielding layer is preferred to be a resin composition containing, in mass percentage (%) relative to all organic pigments, 50 to 75% of a violet organic pigment, 25 to 50% of a yellow organic pigment, or 0 to 30% of a red organic pigment.

The liquid crystal display device of the first aspect of the present invention is preferred to have further a processing unit subtracting detection data of the second light sensor from the detection data of the first light sensor.

In the liquid crystal display device of the first aspect of the present invention, it is preferred that the carbon light-shielding layer, the color filters and the organic pigment light-shielding layer are provided on a transparent substrate that constitutes the color filter substrate, a matrix, in planar view, of a plurality of openings is sectioned by at least one of the carbon pigment light-shielding layer and the organic pigment light-shielding layer, and a red filter, a blue filter and a green filter included in the color filters are provided in the plurality of openings.

The liquid crystal display device of the first aspect of the present invention is preferred to have further a backlight unit provided to back surface of the array substrate with respect to the liquid crystal layer, and the backlight unit is preferred to include a first solid-state light emitting element emitting visible light, a second solid-state light emitting element emitting infrared light for touch sensing, and a processing unit controlling emission timing of the second light emitting element and light-receiving timing of the first light sensor.

In the liquid crystal display device of the first aspect of the present invention, it is preferred that the wavelength of the infrared light ranges from 800 nm to 1000 nm of a wavelength region.

A color filter substrate of a second aspect of the present invention includes at least a laminate configuration of a transparent substrate, a carbon pigment light-shielding layer containing carbon as a main material of light-shielding materials, color filters including a red filter, a blue filter and a green filter in a plurality of openings sectioned on the transparent substrate, and an organic pigment light-shielding layer formed on the color filters and containing an organic pigment as a main material of light-shielding color materials, and include, in a direction perpendicular to a plane of the transparent substrate, a portion where the color filter does not overlap the carbon pigment light-shielding layer and the organic pigment light-shielding layer, and a portion where the color filter overlaps the organic pigment light-shielding layer but does not overlap the carbon pigment light-shielding layer.

In the color filter substrate of the second aspect of the present invention, it is preferred that the organic pigment light-shielding layer is a resin composition containing, in mass percentage (%), 50 to 75% of a violet organic pigment, 25 to 50% of a yellow organic pigment, or 0 to 30% of a red organic pigment.

The color filter substrate of the second aspect of the present invention is preferred to further include a transparent resin layer formed on the color filters, the color filters forming the organic pigment light-shielding layer thereon.

The color filter substrate of the second aspect of the present invention is preferred to have a transparent electrically-conductive film formed on the transparent resin layer.

In the color filter substrate of the second aspect of the present invention, it is preferred that the organic pigment light-shielding layer contains a blue organic pigment, and a formulation ratio of the composition configuring the organic pigment light-shielding layer is adjusted such that transmittance characteristics of light passing through the organic pigment light-shielding layer rise within a range of light wavelength 670 nm to 800 nm.

In the color filter substrate of the second aspect of the present invention, it is preferred that the organic pigment light-shielding layer contains an green organic pigment, and a formulation ratio of the composition configuring the organic pigment light-shielding layer is regulated such that transmittance characteristics of light passing through the organic pigment light-shielding layer rise within a range of light wavelength 670 nm to 800 nm.

A method for producing a color filter substrate of a third aspect of the present invention includes, in this order, the steps of forming a carbon light shielding layer and alignment marks on a transparent substrate, the carbon light shielding layer and the alignment mark containing carbon a main material of light-shielding color materials, forming color filters including a red filter, a blue filter and a green filter, applying a light-shielding resist by coating on the color filters, the light-shielding resist containing an organic pigment as a main material of light-shielding color materials, recognizing a position of the alignment marks using infrared light and infrared light sensor, performing alignment of the transparent substrate and a photomask on the basis of the position of the alignment marks, and exposing a coating film of the light-shielding resist to light using the photomask, developing, and curing, thereby forming an organic pigment light-shielding layer.

The method for producing a color filter substrate of the third aspect of the present invention is preferred to further include a step of forming a transparent resin layer on the color filters, and it is preferred that the organic pigment light-shielding layer is formed on the to transparent resin layer.

In the method for producing a color filter substrate of the third aspect of the present invention, it is preferred that light wavelength of the infrared light is wavelength longer than about 800 nm.

In an aspect of the present invention, detection data of the light sensor can have high accuracy and can be stabilized, and color-separation and touch-sensing can be performed with high accuracy.

DESCRIPTION OF REFERENCE NUMERALS 1, 27, 40 . . . liquid crystal display device, 2, 25, 28, 41 . . . liquid crystal panel, 3, 29 . . . array substrate, 4, 26, 30, 42 . . . color filter substrate, 5, 31 . . . liquid crystal layer, 6, 10 . . . transparent substrate, 7a to 7c . . . insulating layer, 8, 8a, 8b . . . common electrode, 9, 9a, 9b . . . pixel electrode, 11 . . . carbon pigment light-shielding layer, 12, 43 . . . color filter layer, RF . . . red filter, GF . . . green filter, BF . . . blue filter, 13 . . . transparent resin middle layer, 14 . . . organic pigment light-shielding layer, 15 . . . transparent resin layer, 16a, 16b . . . light filter, 17, 17a, 17b . . . liquid crystal driving element, 18a, 18b . . . polarization plate, 19 . . . light controlling element, 20 . . . backlight unit, 21a, 21b, 22a, 22b . . . solid-state light emitting element, 24 . . . processing unit, 32a, 32b . . . counter electrode, 33, 34 . . . alignment film Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device, comprising:
an array substrate;
a liquid crystal layer; and
a color filter substrate facing the array substrate through the liquid crystal layer,
wherein the color filter substrate includes a carbon light-shielding layer, an organic pigment light-shielding layer, and a plurality of color filters formed such that the organic pigment light-shielding layer overlaps with at least one of the color filters in a direction perpendicular to a substrate plane,
the array substrate includes first light sensors configured to detect light which passes through red, blue, and green color filters of the plurality of color filters without passing through the organic pigment light-shielding layer in the direction perpendicular to the substrate plane, and
the array substrate further includes second light sensors configured to detect light which passes through the organic pigment light-shielding layer and the red, blue and green color filters of the plurality of color filters in the direction perpendicular to the substrate plane,
wherein the color filter substrate includes a transparent substrate on which the carbon light-shielding layer, the plurality of color filters and the organic pigment light-shielding layer are formed,
the transparent substrate has a plurality of openings formed in a matrix in planar view such that the red filter, the blue filter and the green filter included in the plurality of color filters are respectively formed in the plurality of openings, and
the openings are sectioned by at least one of the carbon light-shielding layer and the organic pigment light-shielding layer.

2. The liquid crystal display device according to claim 1, wherein the organic pigment light-shielding layer is made from a resin composition including, in mass percentage relative to all organic pigments, 50 to 75% of a violet organic pigment, 25 to 50% of a yellow organic pigment, and 0 to 30% of a red organic pigment.

3. The liquid crystal display device according to claim 1, further comprising:
a processing unit configured to subtract data detected by the second light sensor from data detected by the first light sensor.

4. The liquid crystal display device according to claim 1, further comprising:
a backlight unit disposed on a surface of the array substrate opposite to the liquid crystal layer,
wherein the backlight unit includes
a first solid-state light emitting element configured to emit visible light,
a second solid-state light emitting element configured to emit infrared light, and
a processing unit configured to control emission timing of the second light emitting element and light-receiving timing of the first light sensor.

5. The liquid crystal display device according to claim 4, wherein the infrared light has a wavelength in a range of from 800 nm to 1000 nm.

6. A color filter substrate, comprising:
a transparent substrate;
a carbon light-shielding layer including carbon as a main material of light-shielding materials;
a plurality of color filters including a red filter, a blue filter and a green filter respectively formed in a plurality of openings sectioned on the transparent substrate; and
an organic pigment light-shielding layer formed on the color filters and including an organic pigment as a main material of light-shielding color materials,
wherein the plurality of color filters, the carbon light-shielding layer, and the organic pigment light-shielding layer are formed such that the color filters have a portion which does not overlap with the carbon light-shielding layer and the organic pigment light-shielding layer in a direction perpendicular to a plane of the transparent substrate, and that the color filters have a portion which overlaps with the organic pigment light-shielding layer and does not overlap the carbon light-shielding layer in the direction perpendicular to the plane of the transparent substrate.

7. The color filter substrate according to claim 6, wherein the organic pigment light-shielding layer is made from a resin composition including, in mass percentage, 50 to 75% of a violet organic pigment, 25 to 50% of a yellow organic pigment, and 0 to 30% of a red organic pigment.

8. The color filter substrate according to claim 6, further comprising:
a transparent resin layer formed on the color filters that have the organic pigment light-shielding layer formed thereon.

9. The color filter according to claim 6, further comprising:
a transparent conductive film formed on the transparent resin layer.

10. The color filter substrate according to claim 6, wherein the organic pigment light-shielding layer includes a blue organic pigment, and the resin composition is adjusted such that transmittance of light passing through the organic pigment light-shielding layer increases within a light wavelength range of 670 nm to 800 nm.

11. The color filter substrate according to claim 6, wherein the organic pigment light-shielding layer includes an green organic pigment, and the resin composition is adjusted such that transmittance of light passing through the organic pigment light-shielding layer increases within a light wavelength range of 670 nm to 800 nm.

* * * * *